(12) United States Patent
Barker et al.

(10) Patent No.: US 7,759,008 B2
(45) Date of Patent: Jul. 20, 2010

(54) SODIUM ION BATTERIES

(75) Inventors: Jeremy Barker, Oxfordshire (GB); M. Yazid Saidi, Henderson, NV (US); Jeffrey Swoyer, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 1133 days.

(21) Appl. No.: 10/906,182

(22) Filed: Feb. 7, 2005

(65) Prior Publication Data

US 2005/0238961 A1 Oct. 27, 2005

Related U.S. Application Data

(62) Division of application No. 10/115,787, filed on Apr. 4, 2002, now Pat. No. 6,872,492.

(60) Provisional application No. 60/283,560, filed on Apr. 6, 2001.

(51) Int. Cl.
H01M 4/48 (2010.01)
H01M 4/58 (2010.01)
H01M 4/02 (2006.01)

(52) U.S. Cl. ............ 429/231.8; 429/209; 429/218.1; 429/231.7; 429/231.9

(58) Field of Classification Search .......... 429/220, 429/221, 223, 224, 231.4, 231.5, 231.9
See application file for complete search history.

(56) References Cited

U.S. PATENT DOCUMENTS

| | | | |
|---|---|---|---|
| 4,049,891 | A | 9/1977 | Hong et al. |
| 4,512,905 | A | 4/1985 | Clearfield et al. |
| 5,582,623 | A | 12/1996 | Chu |
| 5,720,121 | A | 2/1998 | Barker et al. |
| 5,871,866 | A | 2/1999 | Barker et al. |
| 5,908,716 | A * | 6/1999 | Barker ............ 429/218.1 |
| 5,910,382 | A | 6/1999 | Goodenough et al. |
| 6,103,419 | A | 8/2000 | Saidi et al. |
| 6,120,941 | A | 9/2000 | Lee et al. |
| 6,136,472 | A | 10/2000 | Barker et al. |
| 6,183,718 | B1 | 2/2001 | Barker et al. |
| 6,203,946 | B1 | 3/2001 | Barker et al. |
| 6,306,215 | B1 | 10/2001 | Larkin |
| 6,316,146 | B1 | 11/2001 | Watanabe et al. |
| 6,514,640 | B1 | 2/2003 | Armand et al. |
| 6,855,273 | B2 * | 2/2005 | Ravet et al. ............ 252/506 |
| 2003/0027049 | A1 | 2/2003 | Barker et al. |
| 2003/0215715 | A1 | 11/2003 | Barker et al. |

FOREIGN PATENT DOCUMENTS

| | | |
|---|---|---|
| DE | 40 24 409 A1 | 2/1992 |
| EP | 0 630 064 B1 | 7/1998 |
| EP | 1 049 182 A1 | 11/2000 |
| JP | 05-325961 B1 | 12/1993 |
| JP | 09-134724 A1 | 5/1997 |
| JP | 09-134725 A1 | 5/1997 |
| JP | 10121259 A1 | 5/1998 |
| JP | 11111294 A1 | 4/1999 |
| WO | WO 97/40541 A1 | 10/1997 |
| WO | WO 01/24305 A1 | 4/2001 |

OTHER PUBLICATIONS

Stevens et al., J. Electrochemical Soc., v. 147(4), pp. 1271-1273 (Apr. 6, 2000).
Rangan et al., J. Solid State Chem., v. 109, pp. 116-121 (1994).
Delmas et al., Solid State Ionics, v. 28-30, pp. 419-423 (1988).
Gopalakrishnan et al., Chemistry of Materials, v. 4(4), pp. 745-747 (1992).
Delmas et al., Mater. Res. Bull., v. 22(5), pp. 631-637 (1987) (abstract).
Nadiri et al., Revue de Chimie minerale, v. 21, pp. 537-544 (1984).
Padhi et al., J. Electrochem. Soc., 144(8), 2581-2586 (1997) (abstract).
Masquelier et al., Proc. Power Sources Conf., 37th, 188-191 (1996).
Gopalakrishnan et al., Chem. Mater., 4(4), 745-7 (1992).
Delmas et al., Solid State Ionics, Volume Date 1987, 28-30 (Pt. 1), 419-23 (1988) (abstract).
Cushing et al., J. Solid State Chem., vol. 162(2), pp. 176-81 (2001).
Masquelier et al., J. Solid State Chem, v. 135, pp. 128-234 (1998).
Delmas et al., Mat. Res. Soc. Symp. Proc., v. 210, pp. 323-334 (1991).
Lutsko, "Ion Exchange and Sorption Process as Methods of Synthesis of Double Phosphates and Intercalated Compounds" Phosphorous, Sulfur, Silicon and the Related Elements, v. 51/52, pp. 97-100 (1990).
Arlt et al., "$Na_5AlF_2(PO_4)_2$: Darstellung, Kristallstruktur and Ionenleitfahigkeit" v. 547, pp. 179-187 (1987) (abstract only).
http://www.webmineral.com/data/Amblygonite.shtml; "Amblygonite Mineral Data Pronunciation Guide" Mineral of the Month Club, 3 pages (2002).
http://www.webmineral.com/data/Lacroixite.shtml; "Lacroixite Mineral Data Pronunciation Guide" Mineral of the Month Club, 3 pp. (2002).
West et al., Solid State Ionics, v. 28-30, pp. 1128-1131 (1988).
Alcantara et al., J. Electrochemical Society, v. 149(2), pp. A201-A205 (2002).
Stevens et al., J. Electrochemical Society, v. 148(8), pp. A803-A811 (2001).

* cited by examiner

*Primary Examiner*—Patrick Ryan
*Assistant Examiner*—Muhammad Siddiquee
(74) *Attorney, Agent, or Firm*—Cynthia S. Kovacevic; Brian T. Mangum; Roger A. Williams

(57) ABSTRACT

Sodium ion batteries are based on sodium based active materials selected among compounds of the general formula $A_aM_b(XY_4)_cZ_d$, wherein A comprises sodium, M comprises one or more metals, comprising at least one metal which is capable of undergoing oxidation to a higher valence state, Z is OH or halogen, and $XY_4$ represents phosphate or a similar group. The anode of the battery includes a carbon material that is capable of inserting sodium ions. The carbon anode cycles reversibly at a specific capacity greater than 100 mAh/g.

10 Claims, 15 Drawing Sheets

Scanning Electron Mircograph of Hard Carbon

Particle Distribution of Hard Carbon

SODIUM ION BATTERIES

This Application is a divisional of application Ser. No. 10/115,787 filed on Apr. 4, 2002, allowed, which is a continuation-in-part of provisional Application No. 60/283,560 filed Apr. 6, 2001.

FIELD OF THE INVENTION

The invention relates to sodium ion batteries. More specifically, the invention relates to anode and cathode materials that reversibly cycle sodium ions.

BACKGROUND OF THE INVENTION

Non-aqueous lithium electrochemical cells typically include an anode, an electrolyte comprising a lithium salt that is dissolved in one or more organic solvents and a cathode of an electrochemically active material, typically a chalcogenide of a transition metal.

Such cells, in an initial condition, are not charged. In order to be used to deliver electrochemical energy, such cells must be charged in order to transfer lithium to the anode from the lithium-containing cathode. During the initial charge, lithium ions are extracted from the cathode and transferred to the anode. During discharge, lithium ions from the anode pass through the liquid electrolyte to the electrochemically active cathode material of the cathode where the ions are taken up with the simultaneous release of electrical energy. During charging, the flow of ions is reversed so that lithium ions pass from the electrochemically active material through the electrolyte and are plated back onto the anode. Upon subsequent charge and discharge, the lithium ions ($Li^+$) are transported between the electrodes. Such rechargeable batteries, having no free metallic species are called rechargeable ion batteries or rocking chair batteries. Rechargeable batteries and non-aqueous aqueous lithium electrochemical cells are discussed in U.S. Pat. Nos. 6,203,946; 5,871,866; 5,540,741; 5,460,904; 5,441,830; 5,418,090; 5,130,211; 4,464,447; and 4,194,062 the disclosures of which are incorporated herein by reference.

Sodium based active materials are described herein for use in ion batteries. The active materials may potentially offer some advantages, such as lower materials costs and the ability to utilize superior electrolyte systems. Until recently the problem with the practical realization of sodium ion batteries has been the lack of both anode (negative) and cathode (positive) electrode materials that could reversibly cycle sodium ions.

SUMMARY OF THE INVENTION

Operation of a sodium-ion battery is demonstrated herein to be analogous to the previously described lithium ion battery operation. The sodium ions are initially extracted from the cathode containing the sodium based active material and transferred to the anode. As previously discussed in relation to the lithium ion battery, during discharge sodium ions from the anode pass through the liquid electrolyte to the electrochemically active sodium based material of the cathode where the ions are taken up with the simultaneous release of electrical energy. Therefore, the electrochemical performance of the sodium ion electrochemical cell is analogous to the previously established lithium ion cell performance.

The invention provides sodium transition metal compounds suitable for incorporation as the (positive) cathode active materials in sodium ion applications. These materials have relatively high operating potential and good specific capacity. The invention further provides an intercalation anode that can insert and de-insert (release) sodium ions during a charge-discharge cycle.

In another embodiment, a battery comprises a cathode, an anode, and an electrolyte. In one embodiment the cathode contains an electrochemically active sodium based material. The sodium based active material is primarily a sodium metal phosphate selected from compounds of the general formula:

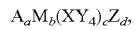

$$A_aM_b(XY_4)_cZ_d,$$

wherein
i. A is selected from the group consisting of sodium and mixtures of sodium with other alkali metals, and $0<a\leq9$;
ii. M comprises one or more metals, comprising at least one metal which is capable of undergoing oxidation to a higher valence state, and $1\leq b\leq3$;
iii. $XY_4$ is selected from the group consisting of $X'O_{4-x}Y'_x$, $X'O_{4-y}Y'_{2y}$, $X''S_4$, and mixtures thereof, where $X'$ is P, As, Sb, Si, Ge, S, and mixtures thereof; $X''$ is P, As, Sb, Si, Ge and mixtures thereof; $Y'$ S is halogen; $0\leq x<3$; and $0<y<4$; and $0<c\leq3$;
iv. Z is OH, halogen, or mixtures thereof, and $0\leq d\leq6$; and
wherein M, X, Y, Z, a, b, c, d, x and y are selected so as to maintain electroneutrality of the compound.

Non-limiting examples of preferred sodium containing active materials include $NaVPO_4F$, $Na_{1+y}VPO_4F_{1+y}$, $NaVOPO_4$, $Na_3V_2(PO_4)_2F_3$, $Na_3V_2(PO_4)_3$, $NaFePO_4$, $NaFe_xMg_{1-x}PO_4$, $Na_2FePO_4F$ and combinations thereof, wherein $0<x<1$, and $-0.2\leq y\leq0.5$. Another preferred active material has the general formula $Li_{1-z}Na_zVPO_4F$ wherein $0<z<1$. In addition to vanadium (V), various transition metals and non-transition metal elements can be used individually or in combination to prepare sodium based active materials.

In an alternate embodiment the anode of the battery includes a hard carbon that is capable of inserting sodium ions. The hard carbon anode cycles reversibly at a specific capacity greater than 100 mAh/g. In a further alternate embodiment the anode including a hard carbon capable of inserting sodium and/or lithium ions reversibly cycles at a specific capacity greater than 200 mAh/g.

DETAILED DESCRIPTION OF THE INVENTION

Figure 1:
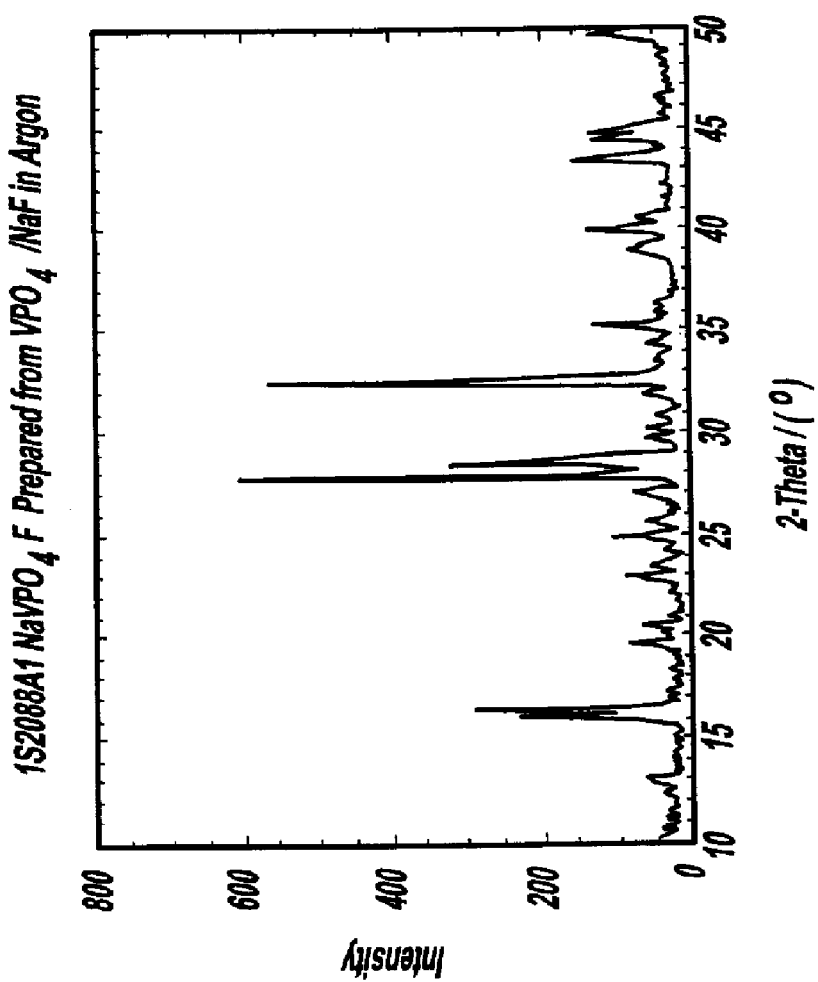
FIG. 1 is an x-ray diffraction pattern for $NaVPO_4F$ prepared by reaction of NaF with $VPO_4$.

In one embodiment, the invention provides new active materials useful as cathodes in sodium ion batteries. The active materials, when formulated into a cathode composition are capable of reversibly cycling sodium ions between the cathode and the anode. In a preferred embodiment, the electrochemical active materials of the invention include sodium transition metal phosphates and sodium transition metal fluorophosphates. Such active materials can take on a range of stoichiometries as are illustrated in non-limiting examples below. Among the sodium transition metal phosphates and fluorophosphates, the transition metals include without limitation those of groups 4 through 11, inclusive, of the periodic table. Preferred transition metals include those of the first transition period, namely Ti, V, Cr, Mn, Fe, Co, and Ni. The active materials may also include a mixture of transition metals, or mixtures of transition metals and non-transition metals. A preferred transition metal is vanadium. Vanadium species that have been synthesized and demonstrated to be effective as electrochemically active cathode materials for use in sodium ion batteries include, without limitation, $NaVPO_4F$, $Na_{1+y}VPO_4F_{1+y}$, $NaVOPO_4$, $Na_3V_2(PO_4)_2F_3$, $NaFe_xMg_{1-x}PO_4$, and $Na_3V_2(PO_4)_3$. In the formulas, $0<x<1$ and the value of y ranges from −0.2 to about 0.5. An electrochemically active transition metal having the formula $Li1-zNazVPO4F$ wherein $0<z<1$ can be further applied.

In another embodiment, the active materials have a general formula $$A_aM_b(XY_4)_cZ_d,$$

wherein
i. A is selected from the group consisting of sodium and mixtures of sodium and other alkali metals, and $0<a\leq 9;\leq$
ii. M comprises one or more metals, comprising at least one metal capable of undergoing oxidation to a higher valence state, and $1\leq b\leq 3$;
iii. $XY_4$ is selected from the group consisting of $X'O_{4-x}Y'_x$, $X'O_{4-y}Y'_{2y}$, $X''S_4$, and mixtures thereof, where X' is P, As, Sb, Si, Ge, V, S, or mixtures thereof; X" is P, As, Sb, Si, V, Ge, or mixtures thereof; Y' is S, N, or halogen; $0\leq x<3$; and $0<y\leq 2$; and $0<c\leq 3$;
iv. Z is OH, halogen, or mixtures thereof, and $0\leq d\leq 6$; and and wherein M, $XY_4$, Z, a, b, c, d, x and y are selected so as to maintain electroneutrality of said compound.

In one preferred embodiment, c=3 in the formula above. In other embodiments, when d=0 and $XY_4$ is phosphate, the active materials of the above formula correspond to the transition metal phosphates described above. When d is greater than 0, the materials of the formula correspond to the transition metal fluorophosphates. In other aspects, the active materials of the above formula represent transition metal phosphates where the phosphate group is partially or completely replaced by groups such as silicate, sulfate, germanate, antimonate, arsenate, monofluoromonophosphate, difluoromonophosphate, and the like, as well as sulfur analogs of the above.

A is selected from the group consisting of Na (sodium), and mixtures of sodium and other alkali metals. A preferred other alkali metal is lithium. In a preferred embodiment, A is a mixture of Li with Na, a mixture of Na with K, or a mixture of Li, Na and K. Preferably "a" is from about 0.1 to about 6, more preferably from about 0.2 to about 6. Where c=1, a is preferably from about 0.1 to about 3, preferably from about 0.2 to about 2. In a preferred embodiment, where c=1, a is less than about 1. In another preferred embodiment, where c=1, a is about 2. Preferably "a" is from about 0.8 to about 1.2. Where c=2, a is preferably from about 0.1 to about 6, preferably from about 1 to about 6. Where c=3, a is preferably from about 0.1 to about 6, preferably from about 2 to about 6, preferably from about 3 to about 6. In another embodiment, "a" is preferably from about 0.2 to about 1.0.

In a preferred embodiment, removal of alkali metal from the electrode active material is accompanied by a change in oxidation state of at least one of the metals comprising M. The amount of said metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A_aM_b(XY_4)_cZ_d$, the amount (a') of alkali metal that can be removed, as a function of the quantity of M (b') and valence ($V^M$) of oxidizable metal, is

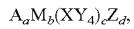

$$a'=b'(\Delta V^M),$$

where $\Delta V^M$ is the difference between the valence state of the metal in the active material and a valence state readily available for the metal. (The term oxidation state and valence state are used in the art interchangeably.) For example, for an active material comprising iron (Fe) in the +2 oxidation state, $\Delta V^M=1$, wherein iron may be oxidized to the +3 oxidation state (although iron may also be oxidized to a +4 oxidation state in some circumstances). If b=1 (one atomic unit of Fe per atomic unit of material), the maximum amount (a') of alkali metal (oxidation state +1) that can be removed during cycling of the battery is 1 (one atomic units of alkali metal). If b=1.25, the maximum amount of (a') of alkali metal that can be removed during cycling of the battery is 1.25.

The value of "b" and the total valence of M in the active material must be such that the resulting active material is electrically neutral (i.e., the positive charges of all anionic species in the material balance the negative charges of all cationic species).

M comprises at least one element capable of undergoing oxidation to a higher oxidation state. Such elements M may be, in general, a transition metal selected from the group consisting of elements from Groups 4-11 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In another preferred embodiment, M further comprises a non-transition metal selected from Groups 2, 3, 12, 13, or 14 of the Periodic Table.

In another preferred embodiment, preferably where c=1, M comprises $Co_e$, $Fe_fM^1_gM^2_hM^3_i$, wherein $M^1$ is at least one transition metal from Groups 4 to 11, $M^2$ is at least one +2 oxidation state non-transition metal, $M^3$ is a +3 oxidation state non transition element, $e \geq 0$, $f \geq 0$, $g \geq 0$, $h \geq 0$, $i \geq 0$ and (e+f+g+h+i)=b. Preferably, a least one of e and f are greater than zero, more preferably both. In a preferred embodiment $0<(e+f+g+h+i) \leq 2$, more preferably $0.8 \leq (e+f+g+h+i) \leq 1.2$, and even more preferably $0.9 \leq (e+f+g+h+\_i) \leq 1.0$. Preferably, $e \geq 0.5$, more preferably $e \geq 0.8$. Preferably, $0.01 \leq f \leq 0.5$, more preferably $0.05 \leq f \leq 0.15$. Preferably, $0.01 \leq g \leq 0.5$, more preferably $0.05 \leq g \leq 0.2$. In a preferred embodiment, (h+i)>1, preferably $0.01 \leq (h+i) \leq 0.5$, and even more preferably $0.01 \leq (h+i) \leq 0.1$. Preferably, $0.01 \leq h \leq 0.2$, more preferably $0.01 \leq h \leq 0.1$. Preferably $0.01 \leq i \leq 0.2$, more preferably $0.01 \leq i \leq 0.1$.

Transition metals useful herein, in addition to Fe and Co, include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals include those selected from the group consisting of Fe, Co, Mn, and mixtures thereof. In a preferred embodiment, M is $Co_{1-m}Fe_m$, where $0<m \leq 0.5$. Preferably $0.01<m \leq 0.1$. Although, a variety of oxidation states for such transition metals is available, in some embodiments it is most preferable that the transition metals have a +2 oxidation state.

In a preferred embodiment, M further comprises non-transition metals or metalloids. In a preferred embodiment, the non-transition metals or metalloids are not readily capable of undergoing oxidation to a higher valence state in the electrode active material under normal operating conditions. Among such elements are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. Particularly preferred non-transition elements include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

As further discussed herein, "b" is selected so as to maintain electroneutrality of the electrode active material. In a preferred embodiment, where c=1, b is from about 1 to about 2, preferably about 1. In another preferred embodiment, where c=2, b is from about 2 to about 3, preferably about 2.

$XY_4$ is selected from the group consisting of $X'O_{4-x}Y'_x$, $X'O_{4-y}Y'_{2y}$, $X''S_4$, and mixtures thereof, where X' is P (phosphorus), As (arsenic), Sb (antimony), Si (silicon), V (vanadium), Ge (germanium), S (sulfur), or mixtures thereof; X" is P, As, Sb, Si, V, Ge or mixtures thereof. In a preferred embodiment, X' and X" are each selected from the group consisting of P, Si, and mixtures thereof. In a particularly preferred embodiment, X' and X" are P. Y is preferably halogen, more preferably F (fluorine).

In a preferred embodiment $0 \leq x \leq 3$; and $0 < y \leq 2$, such that a portion of the oxygen (O) in the $XY_4$ moiety is substituted with halogen, nitrogen, or sulfur. In another preferred embodiment, x and y are 0. In a particularly preferred embodiment $XY_4$ is $X'O_4$, where X' is preferably P or Si, more preferably P. In another particularly preferred embodiment, $XY_4$ is $PO_{4-x}Y'_x$, where Y' is halogen or nitrogen, and $0<x \leq 1$. Preferably $0.01 \leq x \leq 0.05$, more preferably $0.02 \leq x \leq 0.03$.

Z is OH, halogen, or mixtures thereof. In a preferred embodiment, Z is selected from the group consisting of OH (hydroxyl), F (fluorine), Cl (chlorine), Br (bromine) and mixtures thereof. In a preferred embodiment, Z is OH. In another preferred embodiment, Z is F, or mixtures of F with OH, Cl, or Br. In one preferred embodiment, d=0. In another preferred embodiment, d>0, preferably from about 0.1 to about 6, more preferably from about 0.2 to about 6. In such embodiments, where c=1, d is preferably from about 0.1 to about 3, preferably from about 0.2 to about 2. In a preferred embodiment, where c=1, d is about 1. Where c=2, d is preferably from about 0.1 to about 6, preferably from about 1 to about 6. Where c=3, d is preferably from about 0.1 to about 6, preferably from about 2 to about 6, preferably from about 3 to about 6. The composition of M, X, Y, Z and the values of a, b, c, d, x, and y are selected so as to maintain electroneutrality of the electrode active material. As referred to herein "electroneutrality" is the state of the electrode active material wherein the sum of the positively charged species (e.g., A and M) in the material is equal to the sum of the negatively charged species (e.g. $XY_4$) in the material. Preferably, the $XY_4$ moieties are comprised to be, as a unit moiety, an anion having a charge of –2, –3, or –4, depending on the selection of X. When $XY_4$ is a mixture of groups such as the preferred phosphates and phosphate substitutes discussed above, the net charge on the $XY_4$ anion may take on non-integer values, depending on the charge and composition of the individual groups $XY_4$ in the mixture.

The values of a, b, c, d, x, and y may result in stoichiometric or non-stoichiometric formulas for the electrode active materials. In a preferred embodiment, the values of a, b, c, d, x, and y are all integer values, resulting in a stoichiometric formula. In another preferred embodiment, one or more of a, b, c, d, x and y may have non-integer values. It is understood, however, in embodiments having a lattice structure comprising multiple units of a non-stoichiometric formula $A_aM_b(XY_4)_cZ_d$, that the formula may be stoichiometric when looking at a multiple of the unit. That is, for a unit formula where one or more of a, b, c, d, x, or y is a non-integer, the values of each variable become an integer value with respect to a number of units that is the least common multiplier of each of a, b, c, d, x and y. For example, the active material $Li_2Fe_{0.5}Mg_{0.5}PO_4F$ is non-stoichiometric. However, in a material comprising two of such units in a lattice structure, the formula is $Li_4FeMg(PO_4)_2F_2$.

A preferred electrode active material embodiment comprises a compound of the formula

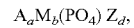

$$A_aM_b(PO_4)Z_d,$$

wherein
i. A is sodium or a mixture of sodium and other alkali metals and $0.1<a \leq 4$;

ii. M comprises at least one transition metal capable of undergoing oxidation to a higher oxidation state and 1≦b≦3; and iii. Z comprises halogen, and 0≦d≦4; and wherein M, Z, a, b, and d are selected so as to maintain electroneutrality of said compound.

In a preferred embodiment, M is $M'_{1-m}M''_m$, where M' is at least one transition metal from Groups 4 to 11 of the Periodic Table; M" is at least one element which is from Group 2, 12, 13, or 14 of the Periodic Table, and 0<m<1. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably M" is selected from the group consisting of Mg, Ca, Zn, Ba, Al, and mixtures thereof. Preferably Z comprises F.

When A is a mixture of lithium and sodium in the formula directly above, and the metal or metals M have an average oxidation state of +2, the preferred materials may be written with formula $$Li_{1-z}Na_zM\ PO_4$$

where z is greater than zero and less than or equal to 1.

Other preferred embodiments of active materials may be used in the sodium ion batteries and lithium ion batteries of the invention. For example, the active materials may be represented by the formula $$A_aLi_eM_b(XY_4)$$

where A is Na or a mixture of Na and K, 0.1<a≦1, and a+e≦1; 1≦b≦1.5, and $XY_4$ is as defined above.

In another embodiment, the active materials have formula:

$$K_aA_eM_b(PO_4)_3$$

where 0.1<a≦6, and a+e≦6, and 1≦b≦3, and where A is sodium, lithium, or a mixture of sodium and lithium.

In another embodiment, the active materials have formula:

$$A_aLi_eM'_bM''_f(PO_4)_3$$

where 0.1<a≦6, and a+e≦6, and 0.1≦b≦3, 1≦(b+f)≦3, and where A is sodium, potassium, or a mixture of sodium and potassium. M' comprises a metal capable of undergoing oxidation to a higher valence state, and M" comprises a non-transition metal selected from groups 2, 3, 12, 13, or 14 of the periodic table.

In yet another embodiment, the active materials have formula:

$$Na_aA_eM_b(XY_4)_3$$

where 0.1<a≦6, and a+e≦6, and 1≦b≦3, with $XY_4$ comprising a mixture of phosphate and silicate represented by $P_{1-x}Si_xO4$, where 0<x≦1. A is lithium, potassium, or a mixture of lithium and potassium.

In another embodiment, the active materials have formula:

$$K_aA_eM_b(XY_4)_3$$

where 0.1<a≦6, and a+e≦6, and 1≦b≦3, and $XY_4$ is a substituted phosphate group given by $P_{1-x}X'_xO4$, where is X' is selected from the group consisting of As, Sb, Si, Ge, V, S, and mixtures thereof, where 0<x≦1. A is sodium, lithium, or a mixture of sodium and lithium.

In another embodiment, the active materials are of formula:

$$A_aLi_eM_b(XY_4)_3$$

where 0.1<a≦6, a+e≦6, and 1≦b≦3; and $XY_4$ is an oxygen substituted group selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is P, As, Sb, Si, V, Ge or mixtures thereof; Y' is S, N, or halogen; 0<x<3; and 0<y≦4.

Another preferred embodiment comprises a compound of the formula $$A_aM^1_eM^2_fM^3_gXY_4,$$

wherein i. A is selected from the group consisting of sodium and mixtures of sodium and other alkali metals, and 0<a≦1.5;

ii. $M^1$ comprises one or more transition metals, where e≧0;

iii. $M^2$ comprises one or more +2 oxidation state non-transition metals, where f>0;

iv. $M^3$ comprises one or more +3 oxidation state non-transition metal, where g≧0;

v. $XY_4$ is selected from the group consisting of $X'O_{4-x}Y'_x$, $X'O_{4-y}Y'_{2y}$, $X''S_4$, and mixtures thereof, where X' is P, As, Sb, Si, Ge, V, S, or mixtures thereof; X" is P, As, Sb, Si, V, Ge, or mixtures thereof; Y' is S, N, or halogen; 0≦x≦3; and 0<y≦2; and wherein e+f+g≧2, and $M^1$, $M^2$, $M^3$, X, Y, a, e, f, g, x, and y are selected so as to maintain electroneutrality of the compound. In embodiments where $XY_4$ is $PO_{4-x}Y'_x$ and $M^1$ is a +2 oxidation state transition metal, a+2e+2f+3g=3−x.

Preferably, e+f+g=b. In a preferred embodiment 0<(e+f+g)≦2, more preferably 0.8≦(e+f+g)≦1.5, and even more preferably 0.9≦(e+f+g)≦1, wherein 0<(f+g)<1, preferably 0.01≦(f+g)≦0.5, more preferably 0.05≦(f+g)≦0.2, and even more preferably 0.05≦(f+g)≦0.1.

In a preferred embodiment, A is Na. Preferably, $M^1$ is at least one transition metal from Groups 4 to 11 of the Periodic Table; $M^2$ is at least one element from Groups 2, 12, or 14 of the Periodic Table, and $M^3$ is a +3 oxidation state element selected from Group 13. Preferably $M^1$ is selected from the group consisting of Fe, Co, Ni, Mn, Cu, V, Zr, Ti, Cr, and mixtures thereof; more preferably $M^1$ is a +2 oxidation state transition metal selected from the group consisting of Fe, Co, Mn, Cu, V, Cr, and mixtures thereof. Preferably $M^2$ is selected from the group consisting +2 oxidation state non-transition metals and mixtures thereof; more preferably $M^2$ is selected from the group consisting of Be, Mg, Ca, Sr, Ba, Ra, Zn, Cd, Hg and mixtures thereof. Preferably, M3 is a +3 oxidation state non-transition metal, preferably $M^3$ is selected from Group 13, more preferably Sc, Y, La, Ac, B, Al, Ga, In, Tl and mixtures thereof. Preferably 0<(f+g)<1, preferably 0.01≦(f+g)≦0.3, more preferably 0.05≦(f+g)≦0.1. Preferably, 0.01≦f≦0.3, more preferably 0.05≦f≦0.1, and even more preferably 0.01≦f≦0.03. Also preferably, 0.01≦g≦0.3, more preferably 0.05≦g≦0.1, and even more preferably 0.01≦g≦0.03.

Another preferred embodiment comprises a compound of the formula $$Na_aCo_eFe_fM^1_gM^2_hM^3_iXY_4$$

wherein i. 0<a≦2, e>0, and f>0;

ii. $M^1$ comprises one or more transition metals, where g≧0;

iii. $M^2$ comprises one or more +2 oxidation state non-transition metals, where h≧0;
iv. $M^3$ comprises one or more +3 oxidation state non-transition elements, where i ≧0; and
v. $XY_4$ is selected from the group consisting of $X'O_{4-x}Y'_x$, $X'O_{4-y}Y'_{2y}$, $X''S_4$, and mixtures thereof, where X' is P, As, Sb, Si, Ge, V, S, or mixtures thereof; X" is P, As, Sb, Si, V, Ge, or mixtures thereof; Y' is S, N, or halogen; 0≦x≦3; and 0<y≦2;

wherein (e+f+g+h+i)≦2, and M1, M2, M3, X, Y, a, e, f, g, h, i, x, and y are selected so as to maintain electroneutrality of said compound. Preferably, 0.8≦(e+f+g +h+i) ≦1.2, more preferably 0.9≦(e+f+g+h+i)≦1. Preferably, e≧0.5, more preferably, e≧0.8. Preferably, 0.01≦f≦0.5, more preferably, 0.05≦f≦0.15. Preferably, 0.01≦g≦0.5, more preferably, 0.05≦g≦0.2. Preferably $M^1$ is selected from the group consisting of Ti, V, Cr, Mn, Ni, Cu and mixtures thereof. Preferably, $M^1$ is Mn.

Preferably, (h+i)>0, more preferably 0.01≦(h+i)≦0.5, more preferably 0.02≦(h+i)≦0.3. Preferably, 0.01≦h≦0.2, more preferably, 0.01≦h≦0.1. Preferably, $M^2$ is selected from the group consisting of Be, Mg, Ca, Sr, Ba, and mixtures thereof. More preferably, $M^2$ is Mg. Preferably, 0.01≦i≦0.2, more preferably 0.01≦i≦0.1. Preferably, $M^3$ is selected from the group consisting of B, Al, Ga, In and mixtures thereof. More preferably, $M^3$ is Al.

In one embodiment, $XY_4$ is $PO_4$. In another embodiment, $XY_4$ is $PO_{4-x}F_x$, and 0<x≦1, preferably, 0.01≦x≦0.05.

Another preferred embodiment comprises a compound having an olivine structure. During charge and discharge of the battery, lithium ions are added to, and removed from, the active material preferably without substantial changes in the crystal structure of the material. Such materials have sites for the alkali metal (Na), the transition metal (M), and the $XY_4$ (e.g., phosphate) moiety. In some embodiments, all sites of the crystal structure are occupied. In other embodiments, some sites may be unoccupied, depending on, for example, the oxidation states of the metal (M). Among such preferred compounds are those of the formula $$AM(PO_{4-x}Y'_x)$$

wherein M is $M^1_gM^2_hM^3_iM^4_j$, and
i. $M^1$ comprises one or more transition metals;
ii. $M^2$ comprises one or more +2 oxidation state non-transition metals;
iii. $M^3$ comprises one or more +3 oxidation state non-transition metals,
iv. $M^4$ comprises one or more +1 oxidation state non-transition metals;
v. Y' is halogen; and
vi. g, >0; h≧0; i≧0; j≧0; (g+h+i+j)≦1. Preferably, g≧0.8, more preferably, g≧0.9. Preferably, $M^1$ is a +2 oxidation state transition metal selected from the group consisting of Ti, V, Cr, Mn, Fe, Co, Ni, Cu and mixtures thereof. More preferably, $M^1$ is selected from the group consisting of Fe, Co, and mixtures thereof.

Preferably, (h+i)>0.1, more preferably, 0.02≦(h+i)≦0.5, more preferably, 0.02≦(h+i)≦0.3. Preferably, 0.01≦h≦0.2, more preferably, 0.01≦h≦0.1. Preferably, $M^2$ is selected from the group consisting of Be, Mg, Ca, Sr, Ba, and mixtures thereof. Preferably, 0.01≦i≦0.2, more preferably, 0.01≦i≦0.1. Preferably, $M^3$ is Al.

In one embodiment, j=0. In another embodiment, 0.01≦j≦0.1. Preferably, $M^4$ is selected from the group consisting of Li, Na, and K. More preferably, $M^4$ is Li.

In one embodiment, x=0. In another embodiment, 0<x≦1. In such an embodiment, preferably, 0.01≦x≦0.05, and (g+h+i+j)<1. In an embodiment where j=0, preferably, (g+h+i)=1-x.

In a preferred embodiment, M in the above formulas may also represent a vanadyl group, written as VO.

In another embodiment, the invention provides a battery having a cathode and anode, and electrolyte, wherein the cathode contains an electrochemically active material that can reversibly cycle sodium ions. (The cathode is defined as the electrode at which reduction occurs during discharge. The anode is the electrode at which oxidation occurs during discharge.) In this embodiment, the anode comprises a material capable of inserting sodium ions and that can cycle reversibly at a specific capacity of greater than 100 milliamp hours per gram, preferably greater than 200, and more preferably more than 300 mAh/g. In a preferred embodiment, the material of the anode comprises a hard carbon having a particle distribution centered on an average particle diameter of 3-6 micrometers. In another embodiment, the preferred hard carbon material is characterized by having a $d_{002}$ spacing of greater than that of graphite. It is theorized that the greater $d_{002}$ spacing is responsible in part for the ability of the material to insert and reversibly cycle sodium ions during operation of the battery of the invention. Crystalline graphite, carbon fibers and petroleum coke materials are generally less preferred anode (negative) electrodes for sodium ion cells. Graphite shows negligible sodium uptake, while petroleum coke and carbon fiber samples show only relatively low specific capacities (typically in the range 50-100 mAh/g under very low rate conditions). In a preferred embodiment, the anode of the invention comprises a hard carbon, such as is commercially available from Osaka Gas Chemical (Osaka Gas, Osaka, Japan). The physical properties for this material are shown in Table 3 below.

Figure 10:
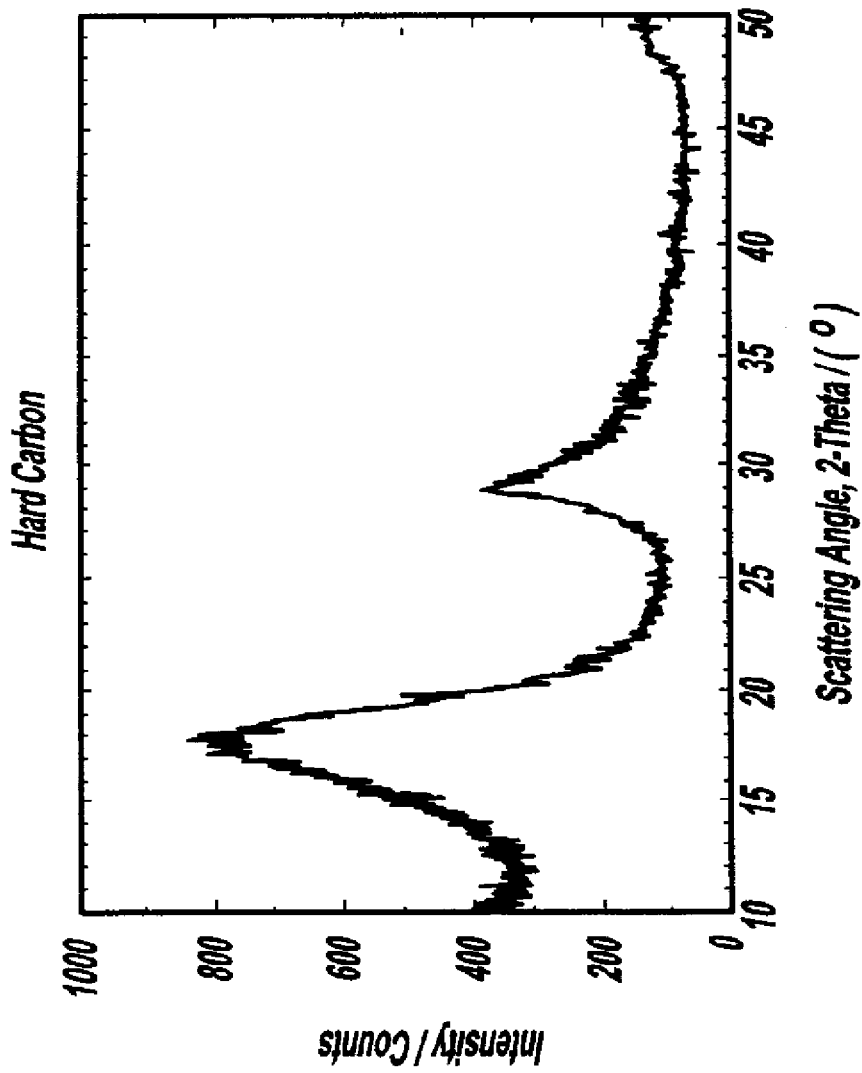
FIG. 10 is an x-ray diffraction pattern for a commercial hard carbon.

FIG. 10 shows the x-ray diffraction data for the Osaka Hard Carbon. A Siemens D500 X-ray Diffractometer equipped with Cu $K_\alpha$ radiation (λ=1.54056 Å) was used for X-ray diffraction (XRD) studies. The broad (002) reflection is clearly centered at 2θ=24.2°. The position, broadness and relatively low intensity of the (002) reflection are consistent for a material possessing low crystallinity and very small crystallite size. The broadness of the peak is also consistent with a random distribution of carbon-carbon layers within the material. The expected (004) reflection at approximately 2θ=43.3° is present. The general features of the x-ray diffraction pattern for the Osaka Gas Hard Carbon are fully consistent with those reported by Dahn and co-workers (*Electrochim. Acta* 38, 1179, (1993) ) for some commercially available hard carbons supplied from an unknown Japanese source, as well as a hard carbon sample synthesized from polyfurfuryl alcohol.

TABLE 3

Physical Properties of Commercial Grade Osaka Hard Carbon

| PROPERTY | VALUE |
| --- | --- |
| Grade | 96-11-1(4) |
| Mean Particle Size | 4.3 μm |
| Ash Content | 0.1% |
| Moisture Content | 0.0% |
| True Specific Gravity | 1.5 g/cc |

For carbon material in general, it is the general industry standard for the values of the interlayer spacing, $d_{002}$, and the lattice constant, a, to be quoted. The (002) peak arises from the stacking of the carbon layers. However, a direct application of the Bragg equation ($n\lambda=2d \sin \theta$) to a broad (002) peak normally yields imprecise values for $d_{002}$. Only when the width of the (002) peak is less than about 2° can its position be reliably used to determine $d_{002}$. The hard carbon of the invention has such a broad (002) peak. Nevertheless, it can be determined from FIG. 12 that the interlayer spacing is larger than is found in, for example, crystalline graphite samples. It can be theorized that the relatively wide interlayer spacing may account for the more facile insertion of sodium ions into the hard carbon structure, whereas there is not appreciable uptake of sodium into a graphitic structure.

Figure 14:
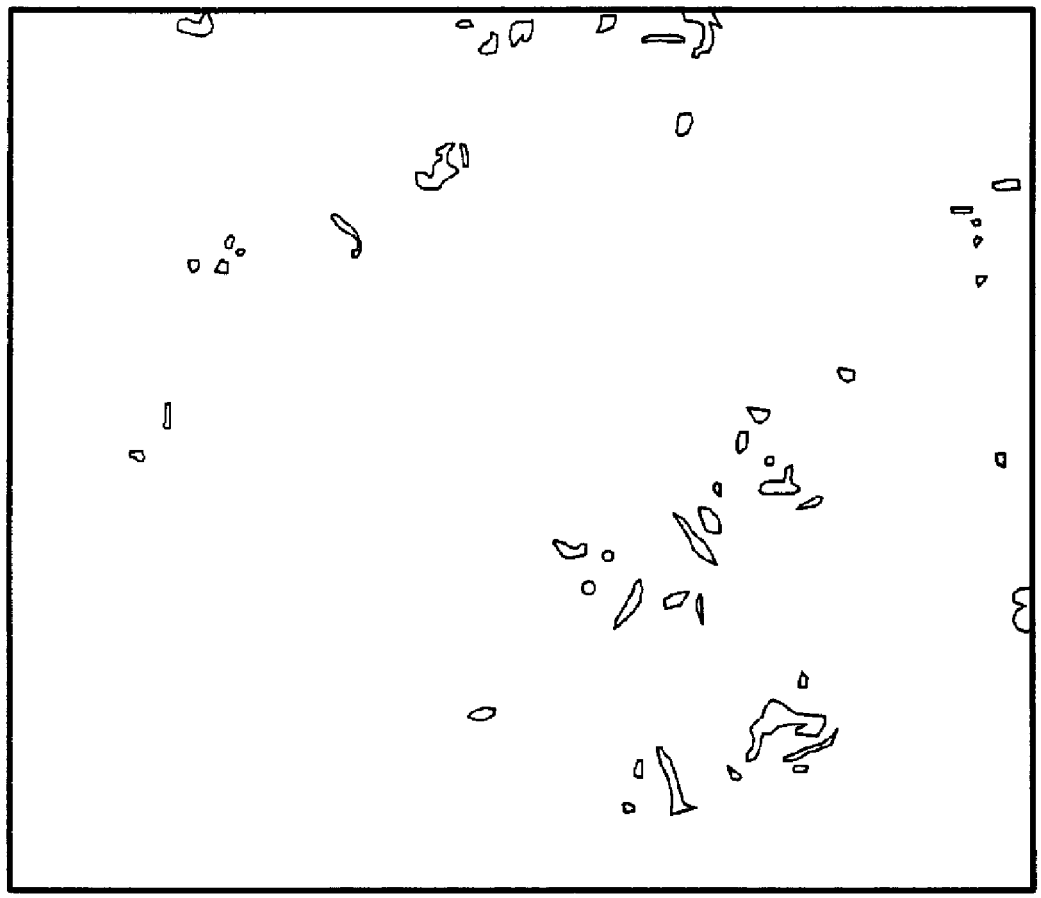
FIG. 14 shows a particle distribution of hard carbon.
Figure 15:
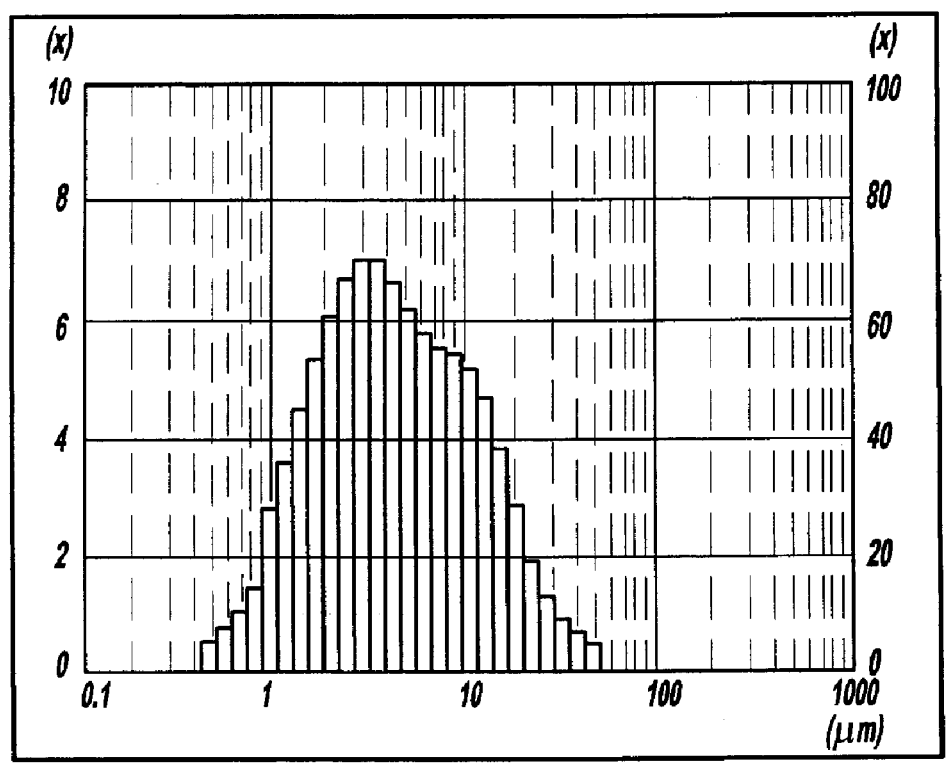
FIG. 15 shows a scanning electron micrograph of hard carbon.

The hard carbon of the invention can be further characterized by the data shown in FIGS. 14 and 15. FIG. 14 shows the particle size distribution for a typical hard carbon. It can be seen that the average particle size is centered around 4.3 micrometers. FIG. 15 shows a scanning electron micrograph of the Osaka hard carbon.

Dahn and co-workers (*J. Electrochem. Soc.* 147, 1271 (2000)) have proposed a tentative mechanism for sodium insertion into carbon materials. They report a structural model having small aromatic fragments of lateral extent around 40 A stacked in a somewhat random fashion like a house of cards. The random stacking gives rise to small regions where multiple layers are parallel to each other. The observed sloping potential profile is attributed to insertion of lithium or sodium between parallel or nearly parallel layers. It is said that the potential decreases with increasing metal content due to the insertion of metal atoms between the layers. Such insertion changes the potential for further insertion, it is theorized, because the turbostratic stacking between parallel sheets gives rise to a distribution of insertion-site potential.

Active materials of general formula $A_aM_b(XY_4)_cZ_d$ are readily synthesized by reacting starting materials in a solid state reaction, with or without simultaneous oxidation or reduction of the metal species involved. According to the desired values of a, b, c, and d in the product, starting materials are chosen that contain "a" moles of alkali metal A from all sources, "b" moles of metals M from all sources, "c" moles of phosphate (or other $XY_4$ species) from all sources, and "d" moles of halide or hydroxide Z, again taking into account all sources. As discussed below, a particular starting material may be the source of more than one of the components A, M, $XY_4$, or Z. Alternatively it is possible to run the reaction with an excess of one or more of the starting materials. In such a case, the stoichiometry of the product will be determined by the limiting reagent among the components A, M, $XY_4$, and Z. Because in such a case at least some of the starting materials will be present in the reaction product mixture, it is usually desirable to provide exact molar amounts of all the starting materials.

In still another aspect, the moiety $XY_4$ of the active material comprises a fluoro-substituted phosphate group, represented by $PO_{4-x}F_x$, where x is less than or equal to 1, and preferably less than or equal to about 0.1. Such groups are formed in the reaction products by providing starting materials containing, in addition to the alkali metal and other metals, phosphate in a molar amount equivalent to the amount necessary to produce a phosphate-containing reaction product. But to make $PO_{4-x}F_x$, the starting materials further comprise a source of fluoride in a molar amount sufficient to substitute F in the product as shown in the formula. This is generally accomplished by including at least "x" moles of F in the starting materials.

It is preferred to synthesize the active materials of the invention using stoichiometric amounts of the starting materials, based on the desired composition of the reaction product expressed by the subscripts a, b, c, and d above. Alternatively it is possible to run the reaction with a stoichiometric excess of one or more of the starting materials. In such a case, the stoichiometry of the product will be determined by the limiting reagent among the components. There will also be at least some unreacted starting material in the reaction product mixture. Because such impurities in the active materials are generally undesirable (with the exception of reducing carbon, to be discussed below), it is generally preferred to provide relatively exact molar amounts of all the starting materials.

The sources of components A, M, phosphate (or other $XY_4$ moiety), and Z may be reacted together in the solid state while heating for a time and temperature sufficient to make a reaction product. The starting materials are provided in powder or particulate form. The powders are mixed together with any of a variety of procedures, such as by ball milling, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms.

Another means for carrying out the reaction at a lower temperature is a hydothermal method. In a hydrothermal reaction, the starting materials are mixed with a small amount of a liquid such as water, and placed in a pressurized bomb. The reaction temperature is limited to that which can be achieved by heating the liquid water under pressure, and the particular reaction vessel used.

The reaction may be carried out without redox, or if desired, under reducing or oxidizing conditions. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in situ by including in the reaction mixture a reductant that will participate in the reaction to reduce a metal M, but that will produce by-products that will not interfere with the active material when used later in an electrode or an electrochemical cell. The reductant will be described in greater detail below. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolize under the reaction conditions to produce a reducing form of carbon. A preferred source of reducing carbon is elemental carbon.

Sources of alkali metal include any of a number of salts or ionic compounds of lithium, sodium, potassium, rubidium or cesium. Lithium, sodium, and potassium compounds are preferred, with lithium being particularly preferred. Preferably, the alkali metal source is provided in powder or particulate form. A wide range of such materials is well known in the field of inorganic chemistry. Examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M, $M^1$, $M^2$, $M^3$, and $M^4$ include salts or compounds of any of the transition metals, alkaline earth metals, or lanthanide metals, as well as of non-transition elements such as aluminum, gallium, indium, thallium, tin, lead, and bismuth. The metal salts or compounds include fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used. The metal M in the starting material may have any oxidation state, depending the oxidation state required in the desired product and the oxidizing or reducing conditions contemplated, as discussed below. In particular, the cobalt and iron of the active materials may be provided by starting materials with $Co^{+2}$, $Co^{+3}$, $Fe^{+2}$, or $Fe^{+3}$. The metal sources are chosen so that at least one metal in the final reaction product is capable of being in an oxidation state higher than it is in the reaction product. In a preferred embodiment, the metal sources also include a +2 non-transition metal. Also preferably, at least one metal source is a source of a +3 non-transition element.

Sources of the desired starting material anions, such as phosphates, are provided by a number of salts or compounds containing positively charged cations in addition to a source of phosphate (or other $XY_4$ species). Such cations include metal ions such as the alkali metals, alkaline metals, transition metals, or other non-transition elements, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate or other $XY_4$ species starting materials are preferably provided in particulate or powder form. Hydrates of any of the above may be used, as can mixtures of the above.

As noted above, the active materials $A_aM_bXY_4$ of the invention can contain a mixture of alkali metals A, a mixture of metals M, and a phosphate group representative of the $XY_4$ group in the formula. In another aspect of the invention, the phosphate group can be completely or partially substituted by a number of other $XY_4$ moieties, which will also be referred to as "phosphate replacements" or "modified phosphates." Thus, active materials are provided according to the invention wherein the $XY_4$ moiety is a phosphate group that is completely or partially replaced by such moieties as sulfate $(SO_4)^{2-}$, monofluoromonophosphate, $(PO_3F)^{2-}$, difluoromonophosphate $(PO_2F)^{2-}$, silicate $(SiO_4)^{4-}$, arsenate, antimonate, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$. They are most conveniently available as the sodium, lithium, or potassium derivative.

To synthesize the active materials containing the modified phosphate moieties, it is usually possible to substitute all or preferably only part of the phosphate compounds discussed above with a source of the replacement anion. The replacement is considered on a stoichiometric basis. Starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or any of the other metals may be a part of the modified phosphate compound.

Non-limiting examples of sources of monofluoromonophosphates include $Na_2PO_3F$, $K_2PO_3F$, $(NH_4)_2PO_3F.H_2O$, $LiNaPO_3F.H_2O$, $LiKPO_3F$, $LiNH_4PO_3F$, $NaNH_4PO_3F$, $NaK_3(PO_3F)_2$ and $CaPO_3F.2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

When it is desired to partially or completely replace phosphorous in the active materials with silicon, it is possible to use a wide variety of silicates and other silicon containing compounds. Thus, useful sources of silicon in the active materials of the invention include orthosilicates, pyrosilicates, cyclic silicate anions such as $(Si_3O_9)^{6-}$, $(Si_6O_{18})^{12-}$ and the like, and pyrocenes represented by the formula $[(SiO_3)^{2-}]_n$, for example $LiAl(SiO_3)_2$. Silica or $SiO_2$ may also be used. Partial substitution of silicate for phosphate is illustrated in Example 4.

Representative arsenate compounds that may be used to prepare the active materials of the invention include $H_3AsO_4$ and salts of the anions $[H_2AsO_4]^-$ and $[HAsO_4]^{2-}$. Sources of antimonate in the active materials can be provided by antimony-containing materials such as $Sb_2O_5$, $M^ISbO_3$ where $M^I$ is a metal having oxidation state +1, $M^{III}SbO_4$ where $M^{III}$ is a metal having an oxidation state of +3, and $M^{II}Sb_2O_7$ where $M^{II}$ is a metal having an oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion.

Sources of sulfate compounds that can be used to partially or completely replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it generally suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

A starting material may provide more than one of the components A, M, and $XY_4$, as is evident in the list above. In various embodiments of the invention, starting materials are provided that combine, for example, the metal and the phosphate, thus requiring only the alkali metal to be added. In one embodiment, a starting material is provided that contains alkali metal, metal, and phosphate. As a general rule, there is flexibility to select starting materials containing any of the components of alkali metal A, metal M, and phosphate (or other $XY_4$ moiety), depending on availability. Combinations of starting materials providing each of the components may also be used.

In general, any anion may be combined with the alkali metal cation to provide the alkali metal source starting material, or with a metal M cation to provide a metal starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to the formation of volatile by-products during the solid state reaction. Thus, it is desirable to choose ammonium salts, carbonates, oxides, hydroxides, and the like where possible. Starting materials with these counterions tend to form volatile by-products such as water, ammonia, and carbon dioxide, which can be readily removed from the reaction mixture.

As noted above, the reactions may be carried out without reduction, or in the presence of a reductant. In one aspect, the reductant, which provides reducing power for the reactions, may be provided in the form of a reducing carbon by including a source of elemental carbon along with the other particulate starting materials. In this case, the reducing power is provided by simultaneous oxidation of carbon to either carbon monoxide or carbon dioxide.

The starting materials containing transition metal compounds are mixed together with carbon, which is included in an amount sufficient to reduce the metal ion of one or more of the metal-containing starting materials without full reduction to an elemental metal state. Excess quantities of one or more starting materials (for example, about a 5 to 10% excess) may be used to enhance product quality. An excess of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon or greater are useable in the process. In a preferred embodiment, the carbon present during compound formation is intimately dispersed throughout the precursor and product. This provides many advantages, including the enhanced conductivity of the product. In a preferred embodiment, the presence of carbon particles in the starting materials is also provides nucleation sites for the production of the product crystals.

Alternatively or in addition, the source of reducing carbon may be provided by an organic material. The organic material is characterized as containing carbon and at least one other element, preferably hydrogen. The organic material generally forms a decomposition product, referred to herein as a carbonaceous material, upon heating under the conditions of the reaction. Without being bound by theory, representative decomposition processes that can lead to the formation of the carbonaceous material include pyrolization, carbonization, coking, destructive distillation, and the like. These process names, as well as the term thermal decomposition, are used interchangeably in this application to refer to the process by which a decomposition product capable of acting as a reductant is formed upon heating of a reaction mixture containing an organic material.

A typical decomposition product contains carbonaceous material. During reaction in a preferred embodiment, at least a portion of the carbonaceous material formed participates as a reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material formed from decomposition of the organic material provides reducing power similar to that provided by elemental carbon discussed above. For example, the carbonaceous material may produce carbon monoxide or carbon dioxide, depending on the temperature of the reaction.

In a preferred embodiment, some of the organic material providing reducing power is oxidized to a non-volatile component, such as for example, oxygen-containing carbon materials such as alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will preferably be enriched in carbon relative to the mole per cent carbon present in the organic material. The carbonaceous material preferably contains from about 50 up to about 100 mole percent carbon.

While in some embodiments the organic precursor material forms a carbonaceous decomposition product that acts as a reductant as discussed above with respect to elemental carbon, in other embodiments a portion of the organic material participates as reductant without first undergoing a decomposition. The invention is not limited by the exact mechanism or mechanisms of the underlying reduction processes.

As with elemental carbon, reactions with the organic precursor material are conveniently carried out by combining starting materials and heating. The starting materials include at least one transition metal compound as noted above. For convenience, it is preferred to carry out the decomposition of the organic material and the reduction of a transition metal in one step. In this embodiment, the organic material decomposes in the presence of the transition metal compound to form a decomposition product capable of acting as a reductant, which reacts with the transition metal compound to form a reduced transition metal compound. In another embodiment, the organic material may be decomposed in a separate step to form a decomposition product. The decomposition product may then be combined with a transition metal compound to form a mixture. The mixture may then be heated for a time and at a temperature sufficient to form a reaction product comprising a reduced transition metal compound.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as halogens, oxygen, nitrogen, phosphorus, and sulfur, may be present in the organic material, as long as they do not significantly interfere with the decomposition process or otherwise prevent the reductions from being carried out. Precursors include organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include starch, cellulose, and their ether or ester derivatives. Other derivatives include the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m(H_2O)_n$, where m and n are integers. For simple hexose or pentose sugars, m and n are equal to each other. Examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ include ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include sucrose, maltose, lactose, trehalose, gentiobiose, cellobiose, and melibiose. Three-ring (trisaccharides such as raffinose) and higher oligomeric and polymer carbohydrates may also be used. Examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as glycerol, sorbitol, mannitol, iditol, dulcitol, talitol, arabitol, xylitol, and adonitol, as well as "slightly oxidized" carbohydrates such as gluconic, mannonic, glucuronic, galacturonic, mannuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150-180° C. Preferably, the liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in situ. The reaction proceeds with carbothermal reduction. The liquid precursor materials may also advantageously serve or function as a binder in the starting material mixture as noted above.

Reducing carbon is preferably used in the reactions in stoichiometric excess. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including polyethylenes, polypropylenes, polystyrenes, polybutadienes, and the like. Depending on the degree of unsaturation, the equivalent weight may be slightly above or below 14.

For organic materials having elements other than carbon and hydrogen, the equivalent weight for the purpose of calculating a stoichiometric quantity to be used in the reactions is generally higher than 14. For example, in carbohydrates it is about 30 g/equivalent. Examples of carbohydrates include sugars such as glucose, fructose, and sucrose, as well as polymers such as cellulose and starch.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air), may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

In a preferred embodiment, reduction is carried out in a reducing atmosphere in the presence of a reductant as discussed above. The term "reducing atmosphere" as used herein means a gas or mixture of gases that is capable of providing reducing power for a reaction that is carried out in the atmosphere. Reducing atmospheres preferably contain one or more so-called reducing gases. Examples of reducing gases include hydrogen, carbon monoxide, methane, and ammonia, as well as mixtures thereof. Reducing atmospheres also preferably have little or no oxidizing gases such as air or oxygen. If any oxidizing gas is present in the reducing atmosphere, it is preferably present at a level low enough that it does not significantly interfere with reduction processes.

The stoichiometry of the reduction can be selected along with the relative stoichiometric amounts of the starting components A, M, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon or an organic material, any excess reducing agent does not present a problem. In the former case, the gas is volatile and is easily separated from the reaction mixture, while in the latter, the excess carbon in the reaction product does not harm the properties of the active material, particularly in embodiments where carbon is added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

When using a reducing atmosphere, it is difficult to provide less than an excess of reducing gas such as hydrogen. Under such as a situation, it is preferred to control the stoichiometry of the reaction by the other limiting reagents. Alternatively the reduction may be carried out in the presence of reducing carbon such as elemental carbon. Experimentally, it would be possible to use precise amounts of reductant carbon as illustrated in the table for the case of reductant hydrogen to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

Before reacting the mixture of starting materials, the particles of the starting materials are intermingled. Preferably, the starting materials are in particulate form, and the intermingling results in an essentially homogeneous powder mixture of the precursors. In one embodiment, the precursor powders are dry-mixed using, for example, a ball mill. Then the mixed powders are pressed into pellets. In another embodiment, the precursor powders are mixed with a binder. The binder is preferably selected so as to not inhibit reaction between particles of the powders. Preferred binders decompose or evaporate at a temperature less than the reaction temperature. Examples include mineral oils, glycerol, and polymers that decompose or carbonize to form a carbon residue before the reaction starts, or that evaporate before the reaction starts. In one embodiment, the binders used to hold the solid particles also function as sources of reducing carbon, as described above. In still another embodiment, intermingling is accomplished by forming a wet mixture using a volatile solvent and then the intermingled particles are pressed together in pellet form to provide good grain-to-grain contact.

The mixture of starting materials is heated for a time and at a temperature sufficient to form an inorganic transition metal compound reaction product. If the starting materials include a reducing agent, the reaction product is a transition metal compound having at least one transition metal in a lower oxidation state relative to its oxidation state in the starting materials.

Preferably, the particulate starting materials are heated to a temperature below the melting point of the starting materials. Preferably, at least a portion of the starting material remains in the solid state during the reaction.

The temperature should preferably be about 400° C. or greater, and desirably about 450° C. or greater, and preferably about 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than about 600° C.; most desirably greater than about 650° C.; preferably about 700° C. or greater; more preferably about 750° C. or greater. Suitable ranges for many reactions are from about 700 to about 950° C., or from about 700 to about 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than about 1200° C. are not thought to be needed.

In one embodiment, the methods of this invention utilize the reducing capabilities of carbon in a unique and controlled manner to produce desired products having structure and alkali metal content suitable for use as electrode active materials. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state. The method utilizes an effective combination of quantity of carbon, time and temperature to produce new products and to produce known products in a new way.

Referring back to the discussion of temperature, at about 700° C. both the carbon to carbon monoxide and the carbon to carbon dioxide reactions are occurring. At closer to about 600° C. the C to $CO_2$ reaction is the dominant reaction. At closer to about 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

The starting materials may be heated at ramp rates from a fraction of a degree up to about 10° C. per minute. Higher or lower ramp rates may be chosen depending on the available equipment, desired turnaround, and other factors. It is also possible to place the starting materials directly into a preheated oven. Once the desired reaction temperature is attained, the reactants (starting materials) are held at the reaction temperature for a time sufficient for reaction to occur. Typically the reaction is carried out for several hours at the final reaction temperature. The heating is preferably conducted under non-oxidizing or inert gas such as argon or vacuum, or in the presence of a reducing atmosphere.

After reaction, the products are preferably cooled from the elevated temperature to ambient (room) temperature (i.e., about 10° C. to about 40° C.). The rate of cooling may vary according to a number of factors including those discussed above for heating rates. For example, the cooling may be conducted at a rate similar to the earlier ramp rate. Such a cooling rate has been found to be adequate to achieve the desired structure of the final product. It is also possible to quench the products to achieve a higher cooling rate, for example on the order of about 100° C./minute.

The general aspects of the above synthesis routes are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

The method includes reacting a lithium containing compound (lithium carbonate, $Li_2CO_3$), a metal containing compound having a phosphate group (for example, nickel phosphate, $Ni_3(PO_4)_2 \cdot xH_2O$, which usually has more than one mole of water), and a phosphoric acid derivative (such as a diammonium hydrogen phosphate, DAHP). The powders are pre-mixed with a mortar and pestle until uniformly dispersed, although various methods of mixing may be used. The mixed powders of the starting materials are pressed into pellets. The first stage reaction is conducted by heating the pellets in an oven at a preferred heating rate to an elevated temperature, and held at such elevated temperature for several hours. A preferred ramp rate of about 2° C./minute is used to heat to a preferable temperature of about 800° C. Although in many instances a heating rate is desirable for a reaction, it is not always necessary for the success of the reaction. The reaction is carried out under a flowing air atmosphere (e.g., when M is Ni or Co), although the reaction could be carried out in an inert atmosphere such as $N_2$ or Ar (when M is Fe). The flow rate will depend on the size of the oven and the quantity needed to maintain the atmosphere. The reaction mixture is held at the elevated temperature for a time sufficient for the reaction product to be formed. The pellets are then allowed to cool to ambient temperature. The rate at which a sample is cooled may vary.

Electrodes:

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:

(a) from about 25% to about 95%, more preferably from about 50% to about 90%, active material;
(b) from about 2% to about 95% electrically conductive material (e.g., carbon black); and
(c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1, 4-phenylene) ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Batteries:

The batteries of the present invention comprise:

(a) a first electrode comprising an active material of the present invention;
(b) a second electrode which is a counter-electrode to said first electrode; and
(c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:

(a) from about 0% to about 95%, preferably from about 25% to about 95%, more preferably from about 50% to about 90%, of an insertion material;
(b) from about 2% to about 95% electrically conductive material (e.g., carbon black); and (c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_{1-m}Ni_mO_2$, where 0<m<1. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

The batteries of this invention also comprise a suitable electrolyte that provides a physical separation but allows transfer of ions between the cathode and anode. The electrolyte is preferably a material that exhibits high ionic conductivity, as well as having insular properties to prevent self-discharging during storage. The electrolyte can be either a liquid or a solid. A liquid electrolyte comprises a solvent and an alkali metal salt that together form an ionically conducting liquid. So called "solid electrolytes" contain in addition a matrix material that is used to separate the electrodes.

One preferred embodiment is a solid polymeric electrolyte, made up of a solid polymeric matrix and a salt homogeneously dispersed via a solvent in the matrix. Suitable solid polymeric matrices include those well known in the art and include solid matrices formed from organic polymers, inorganic polymers or a solid matrix-forming monomer and from partial polymers of a solid matrix forming monomer.

In another variation, the polymer, solvent and salt together form a gel which maintains the electrodes spaced apart and provides the ionic conductivity between electrodes. In still another variation, the separation between electrodes is provided by a glass fiber mat or other matrix material and the solvent and salt penetrate voids in the matrix.

The electrolytes of the present invention comprise an salt dissolved in a mixture of an alkylene carbonate and a cyclic ester. Preferably, the salt of the electrolyte is a lithium or sodium salt. Such salts among those useful herein include $LiAsF_6$, $LiPF_6$, $LiClO_4$, $LiB(C_6H_5)_4$, $LiAlCl_4$, $LiBr$, $LiBF_4$, and mixtures thereof, as well as sodium analogs, with the less toxic salts being preferable. The salt content is preferably from about 5% to about 65%, preferably from about 8% to about 35% (by weight of electrolyte). A preferred salt is $LiBF_4$. In a preferred embodiment, the $LiBF_4$ is present at a molar concentration of from 0.5M to 3M, preferably 1.0M to 2.0M, and most preferably about 1.5M. Electrolyte compositions comprising salts among those useful herein are described in U.S. Pat. No. 5,41 8,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; U.S. Pat. No. 6,103,419, Saidi et al., issued Aug. 15, 2000; and PCT Application WO 01/24305, Barker et al., published Apr. 5, 2001; all of which are incorporated by reference herein.

The electrolyte solvent contains a blend of an alkylene carbonate and a cyclic ester. The alkylene carbonates (preferably, cyclic carbonates) have a preferred ring size of from 5 to 8. The carbon atoms of the ring may be optionally substituted with $C_1$-$C_6$ carbon chains. Examples of unsubstituted cyclic carbonates are ethylene carbonate (5-membered ring), 1,3-propylene carbonate (6-membered ring), 1,4-butylene carbonate (7-membered ring), and 1,5-pentylene carbonate (8-membered ring). Optionally the rings may be substituted with lower alkyl groups, preferably methyl, ethyl, propyl, or isopropyl groups. Such structures are well known; examples include a methyl substituted 5-membered ring (also known as 1,2-propylene carbonate, or simply propylene carbonate (PC) ), and a dimethyl substituted 5-membered ring carbonate (also known as 2,3-butylene carbonate) and an ethyl substituted 5-membered ring (also known as 1,2-butylene carbonate or simply butylene carbonate (BC). Other examples include a wide range of methylated, ethylated, and propylated 5-8 membered ring carbonates. In a preferred embodiment, the first component is a 5-or 6-membered ring carbonate. More preferably, the cyclic carbonate has a 5-membered ring. In a particular preferred embodiment, the alkylene carbonate comprises ethylene carbonate.

The electrolyte solvent also comprises a cyclic ester, preferably a lactone. Preferred cyclic esters include those with ring sizes of 4 to 7. The carbon atoms in the ring may be optionally substituted with $C_1$-$C_3$ chains. Examples of unsubstituted cyclic esters include the 4-membered β-propiolactone (or simply propiolactone); γ-butrolactone (5-membered ring), δ-valerolactone (6-membered ring) and ε-caprolactone (7-membered ring). Any of the positions of the cyclic esters may be optionally substituted, preferably by methyl, ethyl, propyl, or isopropyl groups. Thus, preferred second components include one or more solvents selected from the group of unsubstituted, methylated, ethylated, or propylated lactones selected from the group consisting of propiolacone, butyrolactone, valerolactone, and caprolactone. (It will be appreciated that some of the alkylated derivatives of one lactone may be named as a different alkylated derivative of a different core lactone. To illustrate, γ-butyrolactone methylated on the γ-carbon may be named as γ-valerolactone.)

In a preferred embodiment, the cyclic ester of the second component has a 5-or a 6-membered ring. Thus, preferred second component solvents include one or more compounds selected from γ-butyrolactone (gamma-butyrolactone), and δ-valerolactone, as well as methylated, ethylated, and propylated derivatives. Preferably, the cyclic ester has a 5-membered ring. In a particular preferred embodiment, the second component cyclic ester comprises γ-butyrolactone.

The preferred two component solvent system contains the two components in a weight ratio of from about 1:20 to a ratio of about 20:1. More preferably, the ratios range from about 1:10 to about 10:1 and more preferably from about 1:5 to about 5:1. In a preferred embodiment the cyclic ester is present in a higher amount than the cyclic carbonate. Preferably, at least about 60% (by weight) of the two component system is made up of the cyclic ester, and preferably about 70% or more. In a particularly preferred embodiment, the ratio of cyclic ester to cyclic carbonate is about 3 to 1. In one embodiment, the solvent system is made up essentially of γ-butyrolactone and ethylene carbonate. A preferred solvent system thus contains about 3 parts by weight γ-butyrolactone and about 1 part by weight ethylene carbonate. The preferred salt and solvent are used together in a preferred mixture comprising about 1.5 molar $LiBF_4$ in a solvent comprising about 3 parts γ-butyrolactone and about 1 part ethylene carbonate by weight.

The solvent optionally comprises additional solvents. Such solvents include low molecular weight organic solvents. The optional solvent is preferably a compatible, relatively non-volatile, aprotic, polar solvent. Examples of such optional solvents among those useful herein include chain carbonates such as dimethyl carbonate (DMC), diethyl carbonate (DEC), dipropylcarbonate (DPC), and ethyl methyl carbonate (EMC); ethers such as diglyme, triglyme, and tetraglyme; dimethylsulfoxide, dioxolane, sulfolane, and mixtures thereof.

A separator allows the migration of ions while still providing a physical separation of the electric charge between the electrodes, to prevent short-circuiting. The polymeric matrix itself may function as a separator, providing the physical isolation needed between the anode and cathode. Alternatively, the electrolyte can contain a second or additional polymeric material to further function as a separator. In a preferred embodiment, the separator prevents damage from elevated temperatures within the battery that can occur due to uncontrolled reactions preferably by degrading upon high temperatures to provide infinite resistance to prevent further uncontrolled reactions.

A separator membrane element is generally polymeric and prepared from a composition comprising a copolymer. A preferred composition contains a copolymer of about 75% to about 92% vinylidene fluoride with about 8% to about 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption. In a non-limiting example, a preferred electrolyte separator contains about two parts polymer per one part of fumed silica.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab, for a description of tabs and collectors. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120-160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, a electrode membrane comprising the electrode active material (e.g., an insertion material such as carbon or graphite or a insertion compound) dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001. A preferred electrolyte matrix comprises organic polymers, including VdF:HFP. Examples of casting, lamination and formation of cells using VdF:HFP are as described in U.S. Pat. No. 5,418,091, Gozdz et al., issued May 23, 1995; U.S. Pat. No. 5,460,904, Gozdz et al., issued Oct. 24, 1995; U.S. Pat. No. 5,456,000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

The invention has been described above with respect to several preferred embodiments. Further non-limiting examples of the invention are given in the following examples.

EXAMPLES

The general methods for preparation of the various alkali transition metal phosphates and fluorophosphates will be described in this section. A Siemens D500 X-ray Diffractometer equipped with Cu $K_\alpha$ radiation ($\lambda$=1.54056 A) was used for X-ray diffraction (XRD) studies of the prepared materials.

Example 1

Solid State Synthesis of NaVPO$_4$F using VPO$_4$

This synthesis is generally carried out in two stages—first step to produce VPO$_4$ (for example by carbothermal reduction or by hydrogen reduction) followed by second step reaction with NaF. As an alternative to using NaF, a reaction between VPO$_4$ and NH$_4$F and Na$_2$CO$_3$ was also investigated.

Example 1(a)

First Step: Preparation of VPO$_4$ by Carbothermal Reduction

The reaction is described in copending application Ser. No. 09/724,085, the disclosure of which is hereby incorporated by reference. In summary the overall reaction is:

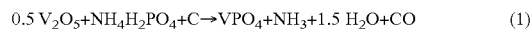

$$0.5\ V_2O_5 + NH_4H_2PO_4 + C \rightarrow VPO_4 + NH_3 + 1.5\ H_2O + CO \qquad (1)$$

31.15 g of V$_2$O$_5$, 39.35 g of NH$_4$H$_2$PO$_4$ (Alfa Aesar) and 4.50 g of Shawinigan black carbon (Chevron Chemical) were used. This represents a 10% excess of carbon. The V$_2$O$_5$ starting material may be prepared from thermal decomposition of ammonium metavanadate. See the discussion below at Example 3.

The precursors were initially pre-mixed using a mortar and pestle and then pelletized. The pellet was then transferred to a temperature-controlled box oven equipped with a flowing air atmosphere. The sample was heated at a ramp rate of 2°/minute to an ultimate temperature of 300° C. and maintained at this temperature for 3 hours. The sample was then cooled to room temperature, before being removed from the tube furnace. The material was recovered, re-mixed and pelletized. The pellet was then transferred to a temperature-controlled tube furnace with a flowing argon gas flow. The sample was heated at a ramp rate of 2°/minute to an ultimate temperature of 750° C. and maintained at this temperature for 8 hours. The sample was then cooled to room temperature, before being removed from the tube furnace for analysis. The powderized sample showed good uniformity and appeared black in color.

Example 1(b)

Preparation of VPO$_4$ using Hydrogen Reduction

In summary the reaction is:

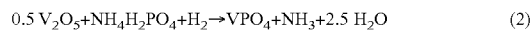

$$0.5\ V_2O_5 + NH_4H_2PO_4 + H_2 \rightarrow VPO_4 + NH_3 + 2.5\ H_2O \qquad (2)$$

24.92 g of V$_2$O$_5$ (Alfa Aesar) and 31.52 g of NH$_4$H$_2$PO$_4$ (Alfa Aesar) were used. The precursors were initially pre-mixed using a mortar and pestle and then pelletized. The pellet was then transferred to a temperature-controlled tube furnace equipped with a flowing hydrogen atmosphere. The sample was heated at a ramp rate of 2°/minute to an ultimate temperature of 300° C. and maintained at this temperature for 8 hours. The sample was then cooled to room temperature, before being removed from the tube furnace. The material was recovered, re-mixed and pelletized. The pellet was then transferred to a temperature-controlled tube furnace, again with a flowing hydrogen gas flow. The sample was heated at a ramp rate of 2°/minute to an ultimate temperature of 850° C. and maintained at this temperature for 8 hours. The sample was then cooled to room temperature, before being removed from the tube furnace for analysis. The powderized sample showed reasonable uniformity and appeared grey in color.

Example 1(c)

Preparation of NaVPO$_4$F by Reaction of VPO$_4$ and NaF

The reaction of NaF with VPO$_4$ to form NaVPO$_4$F may be performed in an inert atmosphere (e.g. argon) or in a covered crucible in a (limited supply) air atmosphere. Examples of each will be given below. In either case the overall reaction may be summarized:

$$NaF + VPO_4 \rightarrow NaVPO_4F \quad (3)$$

Example 1(c)

Reaction 3.2(a): Reaction of NaF with VPO$_4$ to Form NaVPO$_4$F in an Argon Atmosphere 5.836 g of VPO4 (Example 1(a), made by carbothermal reduction) and 1.679 g of NaF (Alfa Aesar) were used. The precursors were initially pre-mixed using a mortar and pestle and then pelletized. The pellet was then transferred to a temperature-controlled tube furnace equipped with a flowing argon atmosphere. The sample was heated at a ramp rate of 2°/minute to an ultimate temperature of 750° C. and maintained at this temperature for 1 hour. The sample was then cooled to room temperature, before being removed from the tube furnace for analysis. The powderized sample showed reasonable uniformity and appeared black in color. In accordance with the incorporation reaction (3), there was only a small weight loss during reaction. FIG. 1 shows the x-ray diffraction pattern for this material.

Example 1(d)

Figure 2:
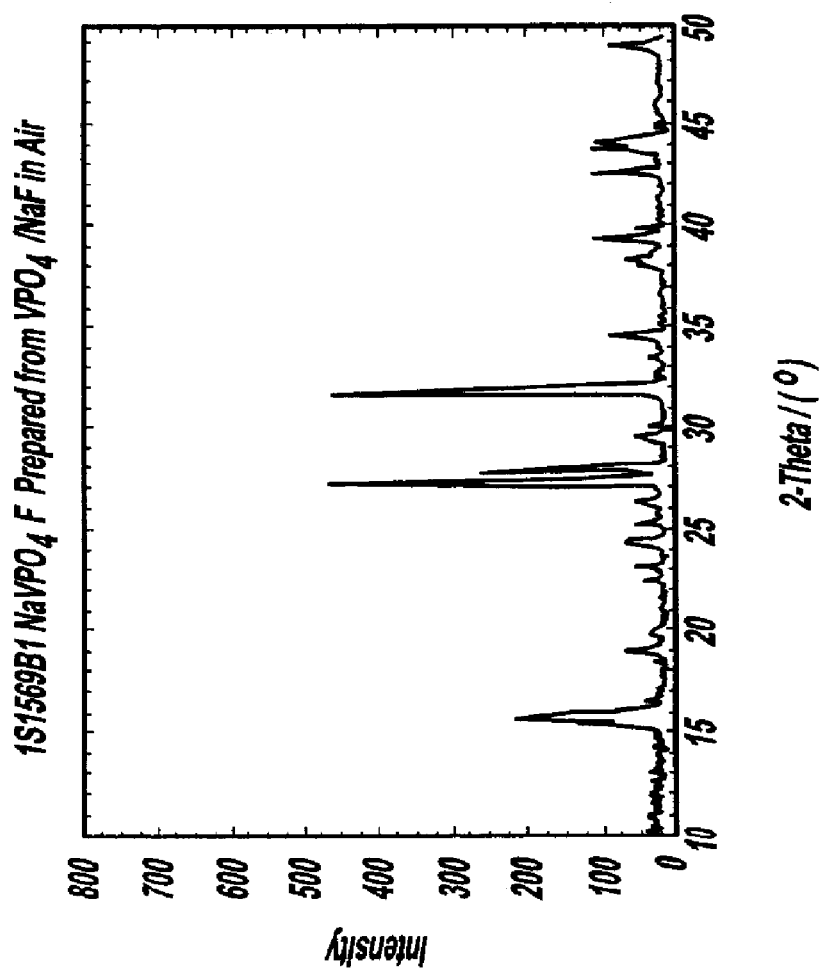
FIG. 2 is an x-ray diffraction pattern of $NaVPO_4F$ formed in a limited air atmosphere.
Figure 7:
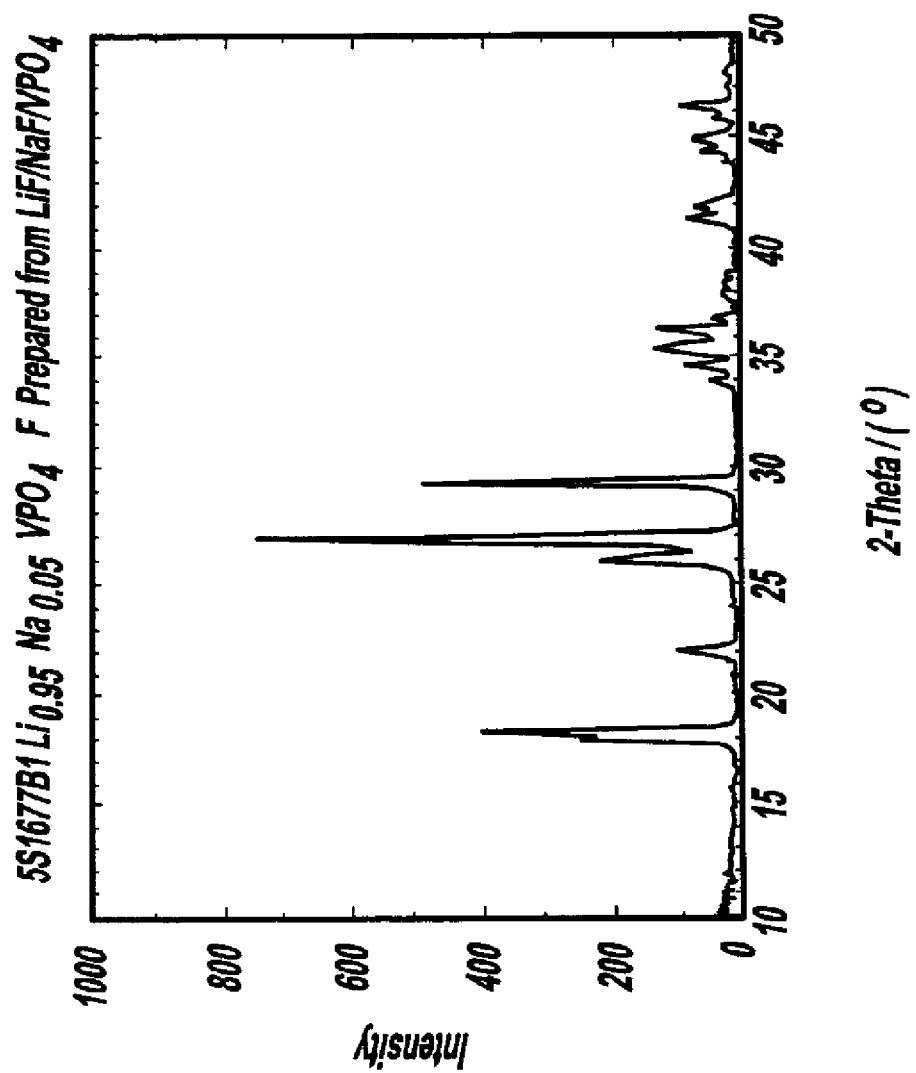
FIG. 7 is an x-ray diffraction pattern for $Li_{0.95}Na_{0.05}VPO_4F$.

Reaction of NaF with VPO$_4$ to Form NaVPO$_4$F in a Limited Air Atmosphere FIG. 7 shows the Synthesis Tracking Log for Sample 1S1569B1. 2.918 g of VPO$_4$ (Example 1(b), made by a carbothermal reduction) and 0.840 g of NaF (Alfa Aesar) were used. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed good uniformity and appeared black in color. In accordance with the incorporation reaction (3), there was only a small weight loss during reaction. FIG. 2 shows the x-ray diffraction pattern for this material.

Example 2

Reaction of NaF with VPO$_4$ to Form Na$_x$VPO$_4$F$_x$ in a limited air atmosphere Examples of Na$_x$VPO$_4$F$_x$ were synthesized using 10%, 20% and 50% mass excess of NaF over reaction (3).

Example 2(a)

10% Excess NaF, x=1.1

Figure 3:
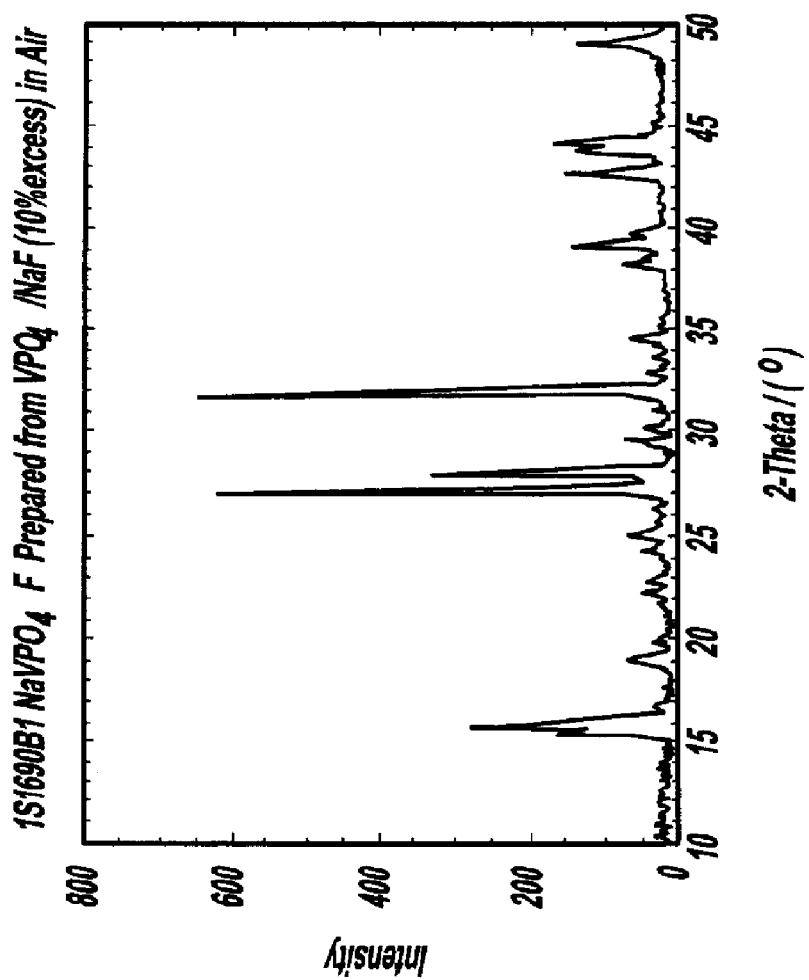
FIG. 3 is an x-ray diffraction pattern for a material $Na_xVPO_4F_x$ synthesized in a limited air atmosphere.

2.918 g of VPO$_4$ (Example 1(b), made by a carbothermal reduction) and 0.924 g of NaF (Alfa Aesar) were used. This represents an approximate 10% mass excess over reaction (3). Thus, the product stoichiometry amounts to Na$_{1.1}$VPO$_4$F$_{1.1}$. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared predominantly black in color. In accordance with the reaction (3), there was only a small weight loss during reaction, indicating almost full incorporation of the NaF. FIG. 3 shows the x-ray diffraction pattern for this material.

Example 2(b)

20% Excess NaF, x=1.2

Figure 4:
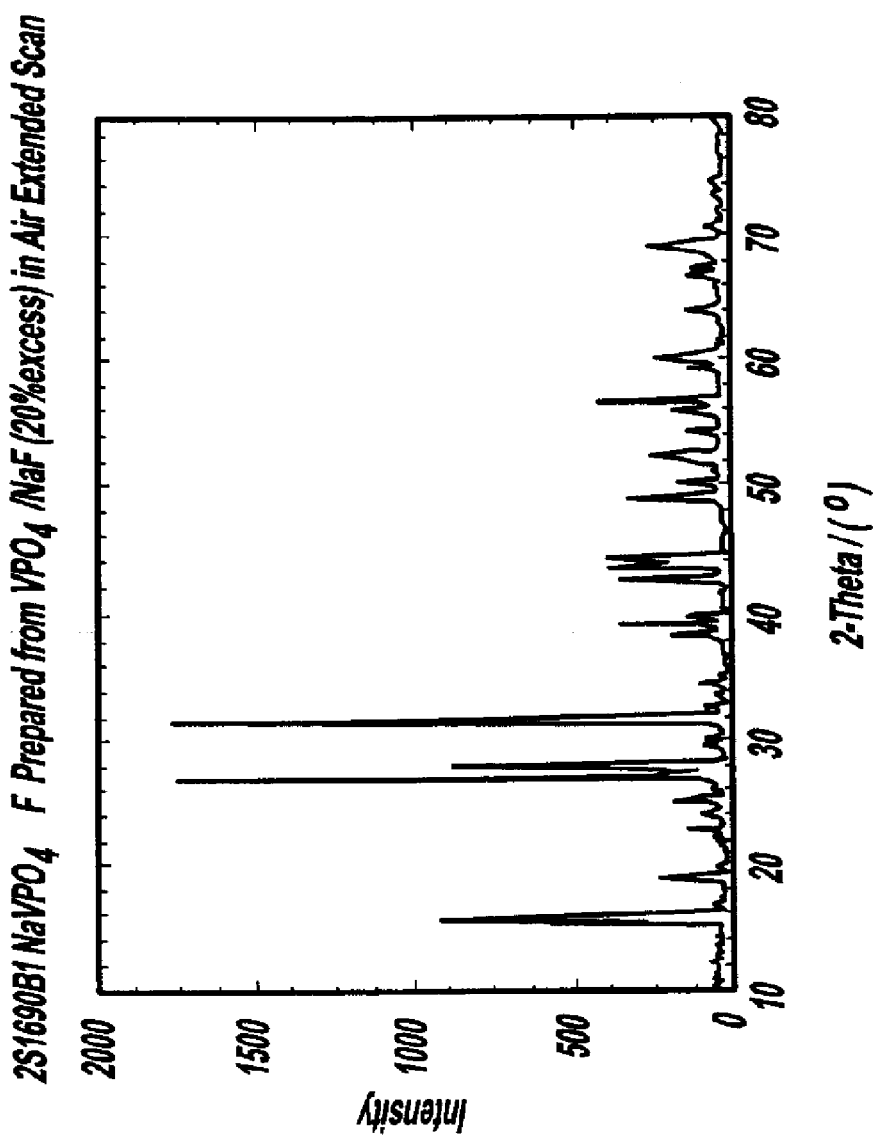
FIG. 4 is an extended range x-ray diffraction pattern 2Π=10–80° for $NaVPO_4F$ prepared with a 20% mass excess NaF.

2.918 g of VPO$_4$ (made by a carbothermal reduction) and 1.008 g of NaF (Alfa Aesar) were used. This represents an approximate a 20% mass excess over reaction (1). Thus, the product stoichiometry amounts to Na$_{1.2}$VPO$_4$F$_{1.2}$. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared predominantly black in color. In accordance with the reaction (3), there was only a small weight loss during reaction indicating almost full incorporation of the NaF. FIG. 4 shows an extended range x-ray diffraction pattern (2θ=10-80°) for this material.

Example 2(c)

50% Excess NaF, x=0.5

1.460 g of VPO$_4$ (made by a carbothermal reduction) and 0.630 g of NaF (Alfa Aesar) were used. This represents an approximate 50% mass excess over reaction (3). Thus, the product stoichiometry amounts to Na$_{1.5}$VPO$_4$F$_{1.5}$. This material is stoichiometrically equivalent to the Na$_3$V$_2$(PO$_4$)$_2$F$_3$ material described later. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared green/black in color.

Example 3

Reaction of $NH_4F$ and $Na_2CO_3$ with $VPO_4$ to Form $NaVPO_4F$ in a Limited Air Atmosphere The reaction of $NH_4F$ and $Na_2CO_3$ with $VPO_4$ to form $NaVPO_4F$ may be performed in an inert atmosphere (e.g. argon) or in a covered crucible in a (limited supply) air atmosphere. Examples of the latter will be given below. The overall reaction may be summarized:

$$0.5Na_2CO_3 + NH_4F + VPO_4 \rightarrow NaVPO_4F + NH_3 + 0.5CO_2 + 0.5 H_2O \qquad (4)$$

Figure 5:
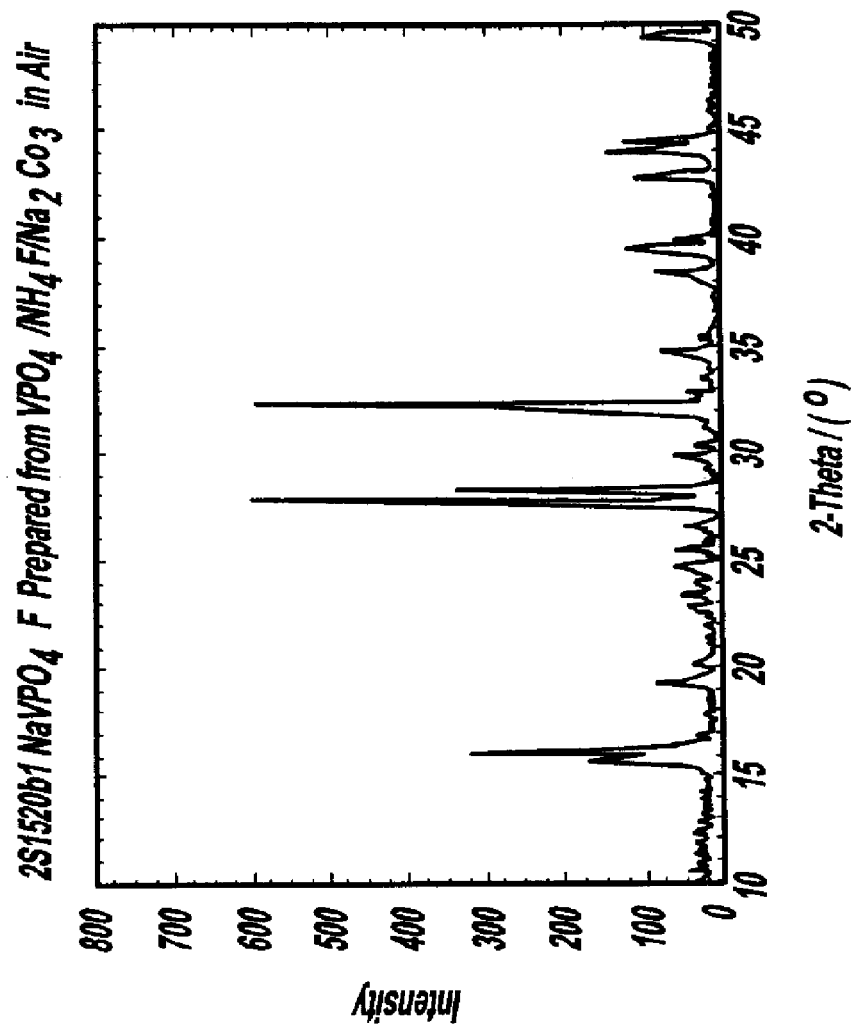
FIG. 5 is an x-ray diffraction pattern for NaVPO4F prepared by reaction of $NH_4F$, $Na_2CO_3$, and $VPO_4$.

1.460 g of $VPO_4$ (made by a carbothermal reduction), 0.370 g of $NH_4F$ (Alfa Aesar) and 0.530 g of $Na_2CO_3$ (Alfa Aesar) were used. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 750° C. and maintained at this temperature for 15 minutes. The sample was then cooled to room temperature, before being removed from the box oven for analysis. The powderized sample showed good uniformity and appeared predominantly black in color. FIG. 5 shows the x-ray diffraction pattern for this material.

Example 4

Preparation of $NaVOPO_4$

The preparation of $NaVOPO_4$ was carried out in three stages:

Example 4(a)

Thermal Decomposition of Ammonium Metavanadate, $NH_4VO_3$, to Produce $V_2O_5$

Commercial $V_2O_5$ exposed to atmospheric reducing agents may contain some $V^{4+}$. Although a commercial source of $V_2O_5$ can be used where required in the synthesis of the active materials of the invention, it is convenient as well to use a $V_2O_5$ material prepared by thermal decomposition of ammonium metavanadate. The decomposition method provides a fast route to a a high-quality $V_2O_5$ material. The reaction for the thermal decomposition of ammonium metavanadate is:

$$2.0\ NH_4VO_3 \rightarrow V_2O_5 + 2.0\ NH_3 + H_2O \qquad (5)$$

The ammonium metavanadate is decomposed at 500° C. in an air-filled box oven. The ammonium metavanadate is commercially available from several sources such as Alfa-Aesar.

Example 4(b)

Chemical Precipitation (Reflux Preparation) of $\alpha$-$VOPO_4 \cdot xH_2O$ 40.1 g of phosphoric acid ($H_3PO_4$—Aldrich Chemical) is dissolved in 200.0 g of deionized water. 7.2 g of solid $V_2O_5$ (from Example 4(a)) is added to the phosphoric acid solution and the suspension is brought to about 80° C. with constant stirring using a stirrer hot plate.

$$0.5\ V_2O_5 + H_3PO_4 + xH_2O \rightarrow VOPO_4 \cdot xH_2O + 1.5\ H_2O \qquad (6)$$

After a reflux period of 16 hours the suspension was filtered and the yellow product washed several times with cold deionized water. Finally the product was dried at 60° C. under a dynamic vacuum.

The drying procedure is expected to remove surface adsorbed water, to leave the dihydrate product, $VOPO_4 \cdot 2H_2O$. The x-ray diffraction pattern for the product is consistent with the layered tetragonal structure expected for this material. This structure consists of sheets of $(VOPO_4)_\infty$ in which each VO group is linked to four $PO_4$ tetrahedra. To confirm the extent of hydration in the product material the sample was studied by thermogravimetric analysis (TGA). The sample was heated in an air atmosphere from 20° C. to 700° C. at a heating rate of 10°/min. For a $VOPO_4 \cdot 2H_2O$ dehydration mechanism, the weight changes expected for the reaction:

$$VOPO_4 \cdot xH_2O \rightarrow VOPO_4 + 2.0\ H_2O \qquad (7)$$

equate to a 18.2% weight loss. In the approximate temperature range 20-200° C., TGA indicates two main processes, presumably related to sequential loss of the two moles of $H_2O$. The overall loss is around 18.0%.

Example 4(c)

Carbothermal Reduction of $VOPO_4$ using $Na_2CO_3$ as Sodium Source

The general reaction scheme may be written:

$$VOPO_4 + 0.5\ Na_2CO_3 + 0.25C \rightarrow NaVOPO_4 + 0.75\ CO_2 \qquad (8)$$

The reaction above is used when the desired reaction temperature is less than about 670° C. and the carbothermal reduction proceeds predominantly via a $CO_2$ mechanism. Conversely, if the desired reaction temperature is greater than about 670° C. the carbothermal reduction proceeds predominantly via a CO mechanism:

$$VOPO_4 + 0.5\ Na_2CO_3 + 0.5C \rightarrow NaVOPO_4 + 0.5\ CO_2 + 0.5\ CO \qquad (9)$$

The $NaVOPO_4$ may be produced by either of the above reactions or a combination of both. Based on the $CO_2$ reaction mechanism:

g-mol of $VOPO_4$ is equivalent to 161.90 g
0.5 g-mol of $Na_2CO_3$ is equivalent to 53.00 g
0.25 g-mol of carbon is equivalent to 3.00 g
4.86 g of $VOPO_4$ (dried at 200° C. to remove $H_2O$), 1.59 g of $Na_2CO_3$ (Alfa Aesar) and 0.105 g of Shawinigan black carbon (Chevron). This represents an approximate 17% excess of carbon in the reaction. The precursors were initially pre-mixed using a mortar and pestle and then pelletized. The pellet was placed in a covered and sealed (to exclude ambient air) Ni crucible and then transferred to a temperature-controlled box oven. The sample was heated at a ramp rate of 2°/minute to an ultimate temperature of 600° C. and maintained at this temperature for 30 minutes. The sample was then cooled to room temperature, before being removed from the box oven for analysis. The powderized sample showed reasonable uniformity and appeared black in color.

Example 4(d)

Synthesis of $NaVOPO_4$ $NaVOPO_4$ is prepared as in Example 4(c) except that the ultimate temperature is 700° C. The powderized sample showed reasonable uniformity and appeared black in color.

Example 5

Synthesis of $Li_xNa_{1-x}VPO_4F$) using $VPO_4$

The synthesis is generally carried out in two stages—first step to produce $VPO_4$ (either by carbothermal reduction of by hydrogen reduction) followed by second step reaction with a mixture of LiF and NaF i.e.

$$xLiF+(1-x)NaF+VPO_4 \rightarrow Li_xNa_{1-x}VPO_4F \quad (10)$$

As an alternative to using alkali fluorides, a reaction between $VPO_4$ and $NH_4F$ and a mixture of $Li_2CO_3$ and $Na_2CO_3$ may also be used. The synthesis of $VPO_4$ is described above.

Example 5(a)

$Li_{0.05}Na_{0.95}VPO_4F$

Figure 6:
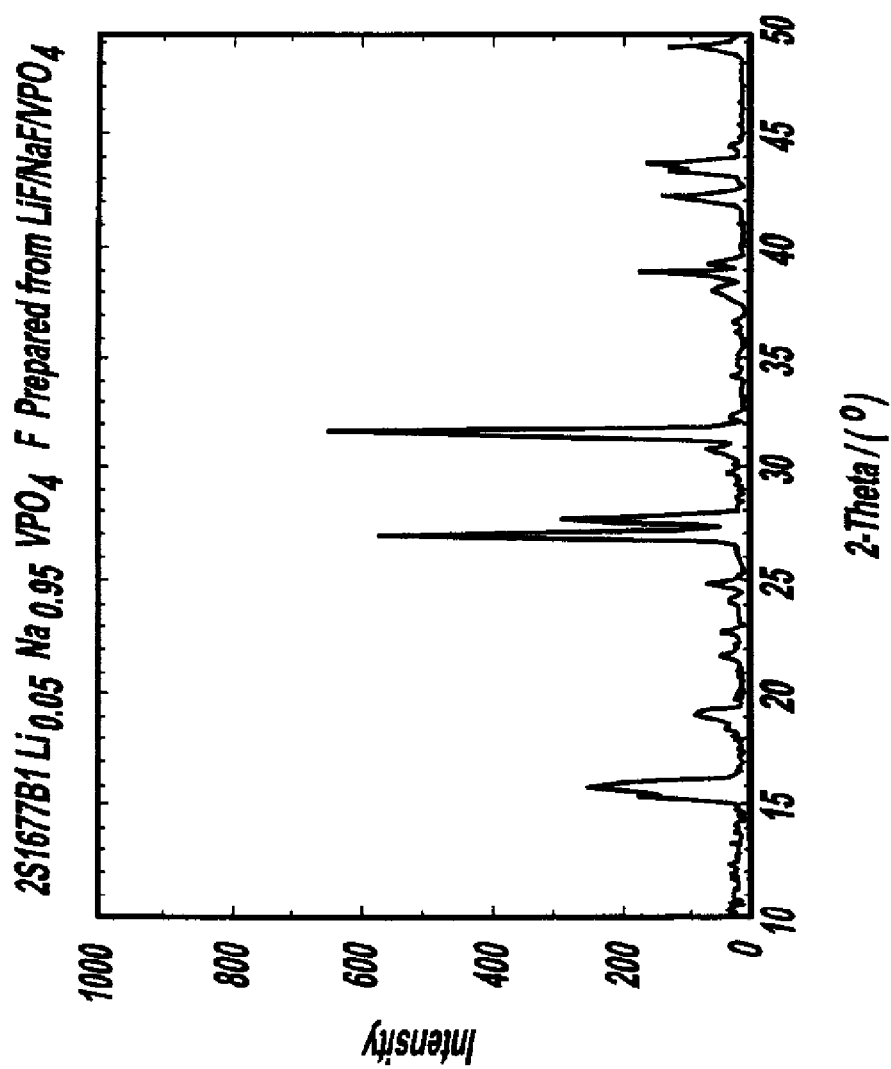
FIG. 6 is an x-ray diffraction pattern for $Li_{0.05}Na_{0.95}VPO_4F$.

Reaction of a mixture of LiF and NaF with $VPO_4$ to form $Li_xNa_{1-x}VPO_4F$ materials in a limited air atmosphere 1.459 g of $VPO_4$ (made by a carbothermal reduction), 0.013 g of LiF (Strem Chemical) and 0.399 g of NaF (Alfa Aesar) were used. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared gray/black in color. In accordance with the incorporation reaction, there was a negligible weight loss during reaction. FIG. 6 shows the x-ray diffraction pattern for this material.

Example 5(b)

$Li_{0.05}Na_{0.95}VPO_4F$ 1.459 9 of $VPO_4$ (made by a carbothermal reduction), 0.026 g of LiF (Strem Chemical) and 0.378 g of NaF (Alfa Aesar) were used. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared black in color. In accordance with the incorporation reaction, there was a negligible weight loss during reaction.

Example 5(c)

$Li_{0.95}Na_{0.05}VPO_4F$ 1.459 g of $VPO_4$ (made by a carbothermal reduction), 0.246 g of LiF (Strem Chemical) and 0.021 g of NaF (Alfa Aesar) were used. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared black in color. In accordance with the incorporation reaction, there was a negligible weight loss during reaction. FIG. 7 shows the x-ray diffraction pattern for this material.

Example 6

Solid State Synthesis of $Na_3V_2(PO_4)_2F_3$ using $VPO_4$

The synthesis methods to produce $Na_3V_2(PO_4)F_3$ are analogous to those used for $NaVPO_4F$ described above, apart from the relative proportions of reactants. It is generally carried out in two stages—a first step to produce $VPO_4$ (either by carbothermal reduction of by hydrogen reduction) followed by a second step reaction with NaF. As an alternative to using NaF, a reaction between $VPO_4$ and $NH_4F$ and $Na_2CO_3$ may also be used.

Example 6(a)

Figure 8:
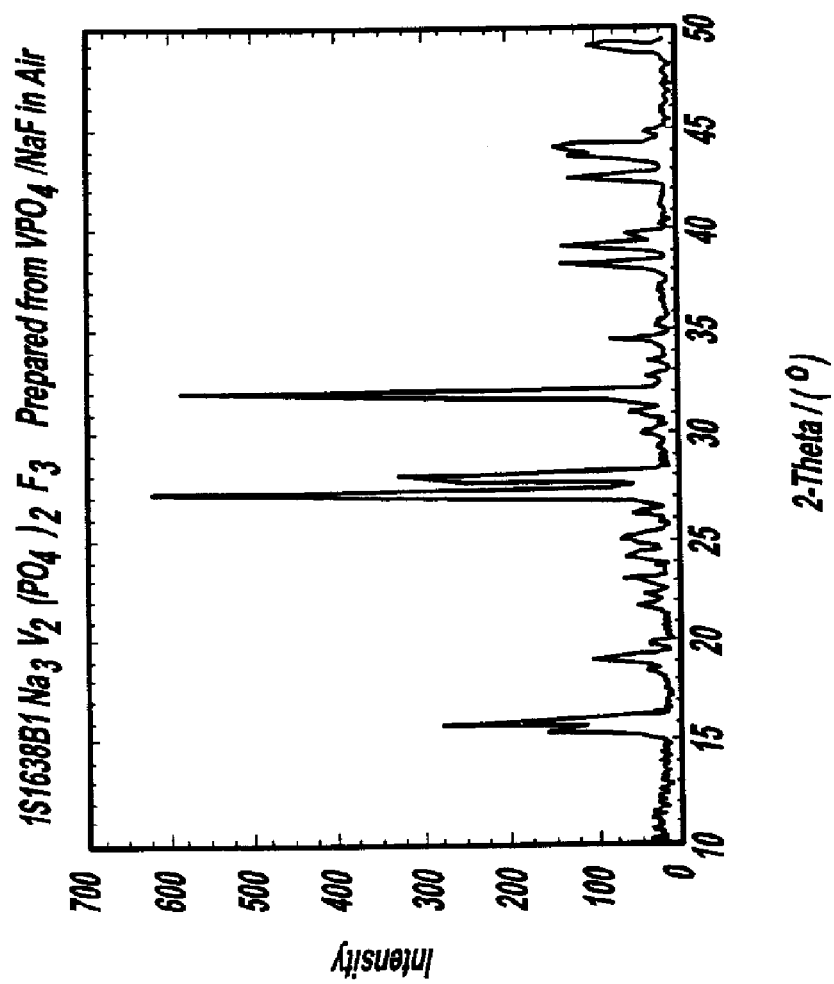
FIG. 8 is an x-ray diffraction pattern of $Na_3V_2(PO_4)_2F_3$.

Reaction of NaF with $VPO_4$ to Form $Na_3V_2(PO_4)_2F_3$ in a Limited Air Atmosphere 2.920 g of $VPO_4$ (made by a carbothermal reduction) and 1.260 g of NaF (Alfa Aesar) were used. The precursors were initially pre-mixed using a mortar and pestle and then pelletized. The pellet was placed inside a covered Ni crucible and then transferred to a temperature-controlled box oven in an air atmosphere. The sample was heated to an ultimate temperature of 700° C. and maintained at this temperature for 15 minutes. The sample was then cooled to room temperature, before being removed from the box oven for analysis. The powderized sample showed reasonable uniformity and appeared gray/black in color. In accordance with the incorporation reaction (3), there was a negligible weight loss during reaction. FIG. 8 shows the x-ray diffraction pattern for this material.

Example 6(b)

Reaction as per 6(a)

Figure 9:
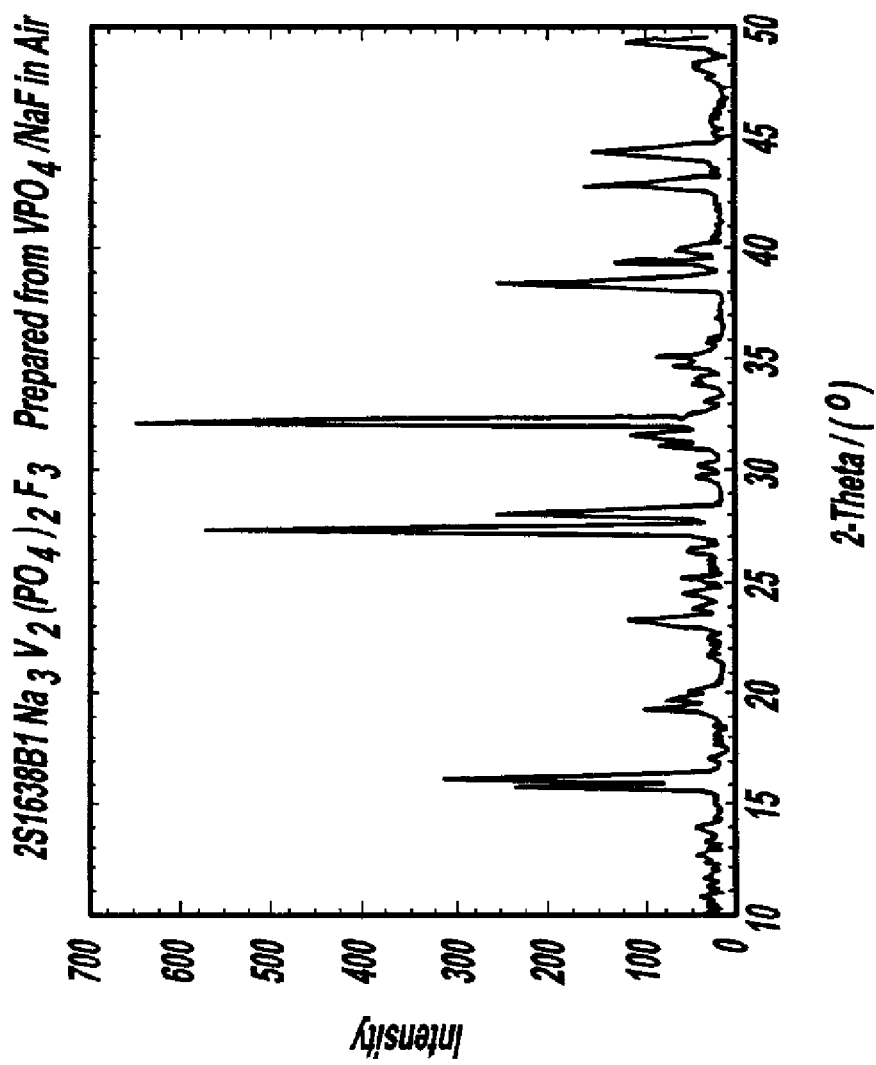
FIG. 9 is an x-ray diffraction pattern of $Na_3V_2(PO_4)_2F3$ prepared from $VPO_4/NAF$ in air.

The synthesis of Example 6(a) was repeated, except the temperature of 700° C. was maintained for one hour. The powderized sample showed reasonable uniformity and appeared gray/black in color. In accordance with the incorporation reaction (3), there was a negligible weight loss during reaction. FIG. 9 shows the x-ray diffraction pattern for this material.

Example 7

Solid State Carbothermal Synthesis of $NaFePO_4$ using $Na_2CO_3/Fe_2O_3$

This expected reaction scheme may be summarized:

$$0.5\ Na_2CO_3 + 0.5\ Fe_2O_3 + (NH_4)_2HPO_4 + 0.5C \rightarrow NaFePO_4 + 2.0\ NH_3 + 0.5CO_2 + CO \quad (11)$$

1.060 g of $Na_2CO_3$ (Alfa Aesar), 1.600 g of $Fe_2O_3$ (Alfa Aesar), 2.640 g of $(NH_4)_2HPO_4$ (Alfa Aesar) and 0.24 g of Shawinigan Black carbon (Chevron Chemical) were used. The carbon amount represents an approximate 100% weight excess over the reaction stoichiometry. The precursors were initially pre-mixed using a mortar and pestle and then pelletized. The pellet was placed inside a covered ceramic crucible and then transferred to a temperature-controlled tube furnace equipped with a flowing argon atmosphere. The sample was heated to an ultimate temperature of 750° C. and maintained at this temperature for 8 hours. The sample was then cooled to room temperature, before being removed from the tube furnace for analysis. The powderized sample showed reasonable uniformity and appeared black in color.

Example 8

Solid State Carbothermal Synthesis of $NaFePO_4$ using $NaPO_3/Fe_2O_3$

The reaction scheme may be summarized:

$$NaPO_3 + 0.5\ Fe_2O_3 + 0.5C \rightarrow NaFePO_4 + CO \qquad (12)$$

2.040 g of $NaPO_3$ (Alfa Aesar), 1.600 g of $Fe_2O_3$ (Alfa Aesar) and 0.24 g of Shawinigan Black carbon (Chevron Chemical) were used. The carbon amount represents an approximate 100% weight excess over the reaction stoichiometry. The precursors were initially pre-mixed using a mortar and pestle and then pelletized. The pellet was placed inside a covered ceramic crucible and then transferred to a temperature-controlled tube furnace equipped with a flowing argon atmosphere. The sample was heated to an ultimate temperature of 750° C. and maintained at this temperature for 8 hours. The sample was then cooled to room temperature, before being removed from the tube furnace for analysis. The powderized sample showed reasonable uniformity and appeared black in color.

Example 9

Solid State Carbothermal Synthesis of $NaFe_{0.9}Mg_{0.1}PO_4$ using $Na_2CO_3/Fe_2O_3$ The reaction scheme may be summarized:

$$0.5\ Na_2CO_3 + 0.45\ Fe_2O_3 + (NH_4)_2HPO_4 + 0.1\ Mg(OH)_2 + 0.45C \rightarrow NaFe_{0.9}Mg_{0.1}PO_4 + 2.0\ NH_3 + 0.5\ CO_2 + 0.45\ CO \qquad (13)$$

0.530 g of $Na_2CO_3$ (Alfa Aesar), 0.719 g of $Fe_2O_3$ (Alfa Aesar), 0.058 g of $Mg(OH)_2$ (Alfa Aesar) and 1.321 g of $(NH_4)_2HPO_4$ (Alfa Aesar) and 0.108 g of Shawinigan Black carbon (Chevron Chemical) were used. The carbon amount represents an approximate 100% weight excess over the reaction stoichiometry. The precursors were initially pre-mixed using a mortar and pestle and then pelletized. The pellet was placed inside a covered nickel crucible (to limit exposure to the air ambient) and then transferred to a temperature-controlled box oven. The sample was heated to an ultimate temperature of 750° C. and maintained at this temperature for 30 minutes. The sample was then cooled to room temperature, before being removed from the box oven for analysis. The powderized sample showed reasonable uniformity and appeared black in color.

Example 10

Solid State Synthesis of $NaCoPO_4$ using $Na_2CO_3/CoCO_3$

The reaction scheme may be summarized:

$$0.5\ Na_2CO_3 + CoCO_3 + (NH_4)_2HPO_4 \rightarrow NaCoPO_4 + 2.0\ NH_3 + 0.5\ CO_2 \qquad (14)$$

2.650 g of $Na_2CO_3$ (Alfa Aesar), 5.940 g of $CoCO_3$ (Alfa Aesar) and 5.750 g of $(NH_4)_2HPO_4$ (Alfa Aesar) were used. The precursors were initially pre-mixed using a mortar and pestle and then pelletized. The pellet was placed inside an open ceramic crucible and then transferred to a temperature-controlled tube furnace equipped with a flowing air atmosphere. The sample was heated to an ultimate temperature of 600° C. and maintained at this temperature for 8 hours. The sample was then cooled to room temperature, before being removed from the tube furnace for analysis. The powderized sample showed good uniformity and appeared pink/purple in color.

Example 11

Solid State Synthesis of $Na_3V_2(PO_4)_3$ using $Na_2CO_3/V_2O_5$ and $H_2$ Atmosphere The reaction scheme may be summarized:

$$1.5\ Na_2CO_3 + V_2O_5 + 3.0\ (NH_4)_2HPO_4 + 2.0\ H_2 \rightarrow Na_3V_2(PO_4)_3 + 6.0\ NH_3 + 6.5\ H_2O + 1.5\ CO_2 \qquad (15)$$

7.000 g of $Na_2CO_3$ (Alfa Aesar), 8.000 g of $V_2O_5$ (Alfa Aesar) and 17.300 g of $(NH_4)_2HPO_4$ (Alfa Aesar) were used. The precursors were initially pre-mixed using a mortar and pestle and then pelletized. The pellet was placed inside an open ceramic crucible and then transferred to a temperature-controlled tube furnace equipped with a flowing pure hydrogen atmosphere. The sample was heated to an ultimate temperature of 170° C. and maintained at this temperature for 8 hours. The sample was then cooled to room temperature, before being removed from the tube furnace. The material was re-mixed and pelletized before being returned to the tube furnace (again equipped with a flowing pure hydrogen atmosphere). The sample was heated to an ultimate temperature of 850° C. and maintained at this temperature for 8 hours. The sample was then cooled to room temperature, before being removed from the tube furnace for analysis. The powderized sample showed good uniformity and appeared black in color.

Example 12

Solid State Carbothermal Synthesis of $Na_3V_2(PO_4)_3$ using $Na_2CO_3/V_2O_5$

The reaction scheme may be summarized:

$$1.5\ Na_2CO_3 + V_2O_5 + 3.0\ (NH_4)_2HPO_4 + 2.0C \rightarrow Na_3V_2(PO_4)_3 + 6.0\ NH_3 + 4.5\ H_2O + 2CO + 1.5\ CO_2 \qquad (16)$$

1.590 g of $Na_2CO_3$ (Alfa Aesar), 1.819 g of $V_2O_5$ (Alfa Aesar), 3.960 g of $(NH_4)_2HPO_4$ (Alfa Aesar) and 0.300 g of Shawinigan Black carbon (Chevron Chemical) were used. The carbon amount represents an approximate 100% weight excess over the reaction stoichiometry. The precursors were initially pre-mixed using a mortar and pestle and then pelletized. The pellet was placed inside an open ceramic crucible and then transferred to a temperature-controlled tube furnace equipped with a flowing argon atmosphere. The sample was heated to an ultimate temperature of 850° C. and maintained at this temperature for 8 hours. The sample was then cooled to room temperature, before being removed from the tube furnace for analysis. The powderized sample showed good uniformity and appeared black in color.

Example 13

Solid State Carbothermal Synthesis of $Na_2FePO_4F$ using $Na_2CO_3/Fe_2O_3$ The reaction scheme may be summarized:

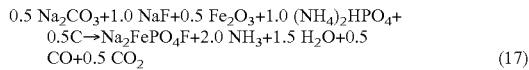

$$0.5\ Na_2CO_3 + 1.0\ NaF + 0.5\ Fe_2O_3 + 1.0\ (NH_4)_2HPO_4 +$$
$$0.5C \rightarrow Na_2FePO_4F + 2.0\ NH_3 + 1.5\ H_2O + 0.5$$
$$CO + 0.5\ CO_2 \quad (17)$$

(m)g of $Na_2CO_3$ (Alfa Aesar), 0.520 g of NaF (Alfa Aesar), 1.000 g of $Fe_2O_3$ (Alfa Aesar), 1.430 g of $(NH_4)_2HPO_4$ (Alfa Aesar) and 0.056 g of Shawinigan Black carbon (Chevron Chemical) were used. The carbon amount represents an approximate 100% weight excess over the reaction stoichiometry. The precursors were initially pre-mixed using a mortar and pestle and then pelletized. The pellet was placed inside an open ceramic crucible and then transferred to a temperature-controlled tube furnace equipped with a flowing argon atmosphere. The sample was heated to an ultimate temperature of 750° C. and maintained at this temperature for 1 hour. The sample was then cooled to room temperature, before being removed from the tube furnace for analysis. The powderized sample showed reasonable uniformity and appeared red/black in color.

It has been observed that the x-ray diffraction patterns are similar for many of the sodium transition metal phosphates and fluorophosphates synthesized above. FIG. 4 shows an extended range x-ray diffraction pattern ($2\theta=10–80°$) of a representative example. The pattern from this material will be used in the analysis below.

Based on a structural refinement, two possible structures were suggested for the representative $NaVPO_4F$ (or $Na_3V_2(PO_4)_3F_2$) materials. Tables 1 and 2 show the expected $2\theta$ peaks ($2\theta=10–50°$) and corresponding d-spacings for the two possible structures based on tetragonal and orthorhombic structures respectively. Table 1 shows the calculated parameters for $NaVPO_4F$ with a tetragonal structure, space group 14/mmm. The predicted lattice parameters are a=6.387 A, c=10.734 A, Z=2.

Table 2 lists the calculated parameters for $NaVPO_4F$ with orthorhombic structure, space group 14 mm. The predicted lattice parameters for this structure are a=10.731 A, c=6.381 A.

The $NaMPO_4$ compounds are generally isostructural with the mineral maricite and with the lithium analogs $LiMPO_4$. For instance $NaFePO_4$ is described as orthorhombic, space group Pnma, with refined lattice parameters a=9.001 A, b=6.874 A and c=5.052 A (from Yakubovich et al. Geol. Ser. 4: 6, 54 (1992)).

The rhombehedral $Na_3M_2(PO_4)_3$ compounds are generally rhombehedral, space group R3m. For instance, Masquelier et al. in *Chem. Mater.* 12, 525, (2000) report $Na_3Fe_2(PO_4)_3$ to be rhombehedral, space group R3m with refined lattice parameters a=8.7270 A and c=21.8078 A.

Electrochemical Characterization in Lithium Metal Half Cells to Demonstrate Sodium Extraction Behavior:

For electrochemical evaluation purposes the active materials were initially cycled against a lithium metal counter electrode in a lithium-containing electrolyte. The active materials were used to formulate the positive electrode. The electrode was fabricated by solvent casting a slurry of the active material, conductive carbon, binder and solvent. The conductive carbon used was Super P (MMM Carbon). Kynar Flex 2801 was used as the binder and electronic grade acetone was used as the solvent. The slurry was cast onto glass and a free-standing electrode film was formed as the solvent evaporated. The proportions are as follows on a weight basis: 80% active material; 8% Super P carbon; and 12% Kynar binder.

For the lithium metal electrochemical measurements the liquid electrolyte was Ethylene Carbonate/DiMethyl Carbonate, EC/DMC (2:1 by weight) and 1 M $LiPF_6$. This was used in conjunction with a Glass Fiber filter to form the anode-cathode separator. Routine electrochemical testing was carried out using a commercial Maccor battery cycler utilizing constant current cycling between pre-set voltage limits.

First cycle constant current data of the $NaVPO_4F$ material made from $NaF/VPO_4$ in air were collected using a lithium metal counter electrode at a current density of 0.2 mA/cm$^2$ between 3.00 and 4.50 V and are based upon 41.1 mg of the $NaVPO_4F$ active material in the positive electrode. The testing was carried out at 23° C. It is demonstrated that sodium is extracted from the $NaVPO_4F$ during the initial charging of the cell. A charge equivalent to a material specific capacity of 97 mAh/g is extracted from the cell. It is expected from thermodynamic considerations that the sodium extracted from the $NaVPO_4F$ material during the initial charging process, enters the electrolyte, and would then be displacement 'plated' onto the lithium metal anode (i.e. releasing more lithium into the electrolyte). Therefore, during the subsequent discharging of the cell, it is assumed that lithium is re-inserted into the material. The re-insertion process corresponds to 85 mAh/g, indicating the reversibility of the extraction-insertion processes. The generally symmetrical nature of the charge-discharge curves further indicates the excellent reversibility of the system. From closer inspection of the figure it appears that sodium is extracted from the $NaVPO_4F$ in two processes centered around 3.80 V vs. Li and 4.30 V vs. Li. There also appear to be two main insertion processes, centered at about 4.25 V vs. Li and 3.75 V vs. Li. Subsequent charge-discharge cycles show very similar steps in the voltage profile, indicating the reversibility of the material.

First cycle constant current data of the $Li_{0.10}Na_{0.90}VPO_4F$ material made from $LiF/NaF/VPO_4$ in air were collected using a lithium metal counter electrode at a current density of 0.2 mA/cm$^2$ between 3.00 and 4.50V and are based upon 19.5 mg of the $Li_{0.10}Na_{0.90}VPO_4F$ active material in the positive electrode. The testing was carried out at 23° C. It is demonstrated that sodium is extracted predominantly from the $Li_{0.10}Na_{0.90}VPO_4F$ during the initial charging of the cell—although some lithium will also be extracted. A charge equivalent to a material specific capacity of 76 mAh/g is extracted from the cell. It is expected from thermodynamic considerations that the sodium extracted from the $Li_{0.10}Na_{0.90}VPO_4F$ material during the initial charging process, enters the electrolyte, and would then be displacement 'plated' onto the lithium metal anode (i.e. releasing more lithium into the electrolyte). Therefore, during the subsequent discharging of the cell, it is assumed that lithium is re-inserted into the material. The re-insertion process corresponds to 70 mAh/g, indicating the reversibility of the extraction-insertion processes. The generally symmetrical nature of the charge-discharge curves further indicates the excellent reversibility of the system. From closer inspection of the figure it appears that sodium (plus some lithium) is extracted from the $Li_{0.10}Na_{0.90}VPO_4F$ in two processes centered around 3.80 V vs. Li and 4.30 V vs. Li. There also appear to be two main insertion processes, centered at about 4.25 V vs. Li and 3.75 V vs. Li. Subsequent charge-discharge cycles show very similar steps in the voltage profile, indicating the reversibility of the material.

First cycle constant current data of the $Na_3V_2(PO_4)_2F_3$ material made from $NaF/VPO_4$ in air at 700° C. for 15 minutes were collected using a lithium metal counter electrode at a current density of 0.2 mA/cm$^2$ between 3.00 and 4.50 V and are based upon 24.2 mg of the Na$_3$V$_2$(PO$_4$)$_2$F$_3$ active material in the positive electrode. The testing was carried out at 23° C. It is demonstrated that sodium is extracted from the Na$_3$V$_2$(PO$_4$)$_2$F$_3$ during the initial charging of the cell. A charge equivalent to a material specific capacity of 99 mAh/g is extracted from the cell. It is expected from thermodynamic considerations that the sodium extracted from the Na$_3$V$_2$(PO$_4$)$_2$F$_3$ material during the initial charging process, enters the electrolyte, and would then be displacement 'plated' onto the lithium metal anode (i.e. releasing more lithium into the electrolyte). Therefore, during the subsequent discharging of the cell, it is assumed that lithium is re-inserted into the material. The re-insertion process corresponds to 86 mAh/g, indicating the reversibility of the extraction-insertion processes. The generally symmetrical nature of the charge-discharge curves further indicates the excellent reversibility of the system. From closer inspection of the figure it appears that sodium is extracted from the Na$_3$V$_2$(PO$_4$)$_2$F$_3$ in two processes centered around 3.80 V vs. Li and 4.30 V vs. Li. There also appear to be two main insertion processes, centered at about 4.25 V vs. Li and 3.75 V vs. Li. Subsequent charge-discharge cycles show very similar steps in the voltage profile, indicating the reversibility of the material.

First cycle constant current data of the NaVOPO$_4$ material made carbothermally at 600° C. for 30 minutes were collected using a lithium metal counter electrode at an approximate C/10 rate between 3.00 and 4.60 V and are based upon 24.3 mg of the NaVOPO$_4$ active material in the positive electrode. The testing was carried out at 23° C. The initial measured open circuit voltage (OCV) was approximately 3.20 V vs. Li. It is demonstrated that sodium is extracted from the NaVOPO$_4$ during the first charging of the cell. A charge equivalent to a material specific capacity of 51 mAh/g is extracted from the cell. It is expected from thermodynamic considerations that the sodium extracted from the NaVOPO$_4$ material during the initial charging process would be displacement 'plated' onto the lithium metal anode. Therefore, during the subsequent discharging of the cell, it is assumed that lithium is re-inserted into the material. The re-insertion process corresponds to 30 mAh/g, indicating the reversibility of the extraction-insertion processes. The generally symmetrical nature of the charge-discharge curves further indicates the reversibility of the system.

As was noted during the previous (preparative) section, NaVOPO$_4$ may be prepared under a variety of carbothermal conditions. As a comparison the first cycle constant current data of the NaVOPO$_4$ material made carbothermally at 700° C. for 30 minutes were collected using a lithium metal counter electrode at an approximate C/10 rate between 3.00 and 4.60 V and are based upon 24.3 mg of the NaVOPO$_4$ active material in the positive electrode. The testing was carried out at 23° C. The initial measured open circuit voltage (OCV) was approximately 3.25 V vs. Li. It is demonstrated that sodium is extracted from the NaVOPO$_4$ during the first charging of the cell. A charge equivalent to a material specific capacity of 97 mAh/g is extracted from the cell. It is expected from thermodynamic considerations that the sodium extracted from the NaVOPO$_4$ material during the initial charging process would be displacement 'plated' onto the lithium metal anode. Therefore, during the subsequent discharging of the cell, it is assumed that lithium is re-inserted into the material. The re-insertion process corresponds to 80 mAh/g, indicating the excellent reversibility of the extraction-insertion processes for this material. The generally symmetrical nature of the charge-discharge curves further indicates the excellent reversibility of the system. The improved test results for this material over the equivalent material made at 600° C. indicates the importance of the carbothermal preparative conditions.

First cycle constant current data of the Na$_3$V$_2$(PO$_4$)$_3$ material made from carbothermal reduction using Na$_2$CO$_3$ and V$_2$O$_5$ were collected using a lithium metal counter electrode at a current density of 0.2 mA/cm$^2$ between 2.80 and 4.00 V and are based upon 27.4 mg of the Na$_3$V$_2$(PO$_4$)$_3$ active material in the positive electrode. The testing was carried out at 23° C. It is demonstrated that sodium is extracted from the Na$_3$V$_2$(PO$_4$)$_3$ during the initial charging of the cell. A charge equivalent to a material specific capacity of 91 mAh/g is extracted from the cell. It is expected from thermodynamic considerations that the sodium extracted from the Na$_3$V$_2$(PO$_4$)$_3$ material during the initial charging process enters the electrolyte, and would then be displacement 'plated' onto the lithium metal anode (i.e. releasing more lithium into the electrolyte). Therefore, during the subsequent discharging of the cell, it is assumed that lithium is re-inserted into the material. The re-insertion process corresponds to 59 mAh/g, indicating the reversibility of the extraction-insertion processes. The generally symmetrical nature of the charge-discharge curves further indicates the excellent reversibility of the system. From closer inspection of the figure it appears that sodium is extracted from the Na$_3$V$_2$(PO$_4$)$_3$ in a single process centered around 3.70 V vs. Li. There also appear to be a single insertion processes, centered at about 3.60 V vs. Li.

Electrochemical Characterization in Sodium Ion Cells

Sodium ion cells comprise an anode, cathode and an electrolyte. The cells were constructed using a NaVPO$_4$F active material cathode. The cathode material was made by the method described in section 3.1. The anode material was the Osaka Gas hard carbon described above. For all electrochemical cells the liquid electrolyte was Ethylene Carbonate/DiMethyl Carbonate, EC/DMC (2:1 by weight) and 1 M NaClO$_4$. This was used in conjunction with a Glass Fiber filter to form the anode-cathode separator. Routine electrochemical testing was carried out using a commercial battery cycler utilizes constant current cycling between pre-set voltage limits. High-resolution electrochemical data was collected using the electrochemical voltage spectroscopy (EVS) technique. Such technique is known in the art as described in Synth. Met. D217 (1989); Synth. Met. 32, 43 (1989); J. Power Sources, 52, 185 (1994); and Electrochimica Acta 40, 1603 (1995).

The carbon electrode was fabricated by solvent casting a slurry of Osaka Gas hard carbon, conductive carbon, binder and casting solvent. The conductive carbon used was Super P (MMM Carbon). Kynar Flex 2801 was used as the binder and the electronic grade acetone was used as the solvent. The slurry was cast onto glass and a free-standing electrode film was formed as the solvent evaporated. The proportions for all the example iterations shown are as follows on a weight basis: 85% active material; 3% Super P carbon; and 12% Kynar binder.

Figure 11:
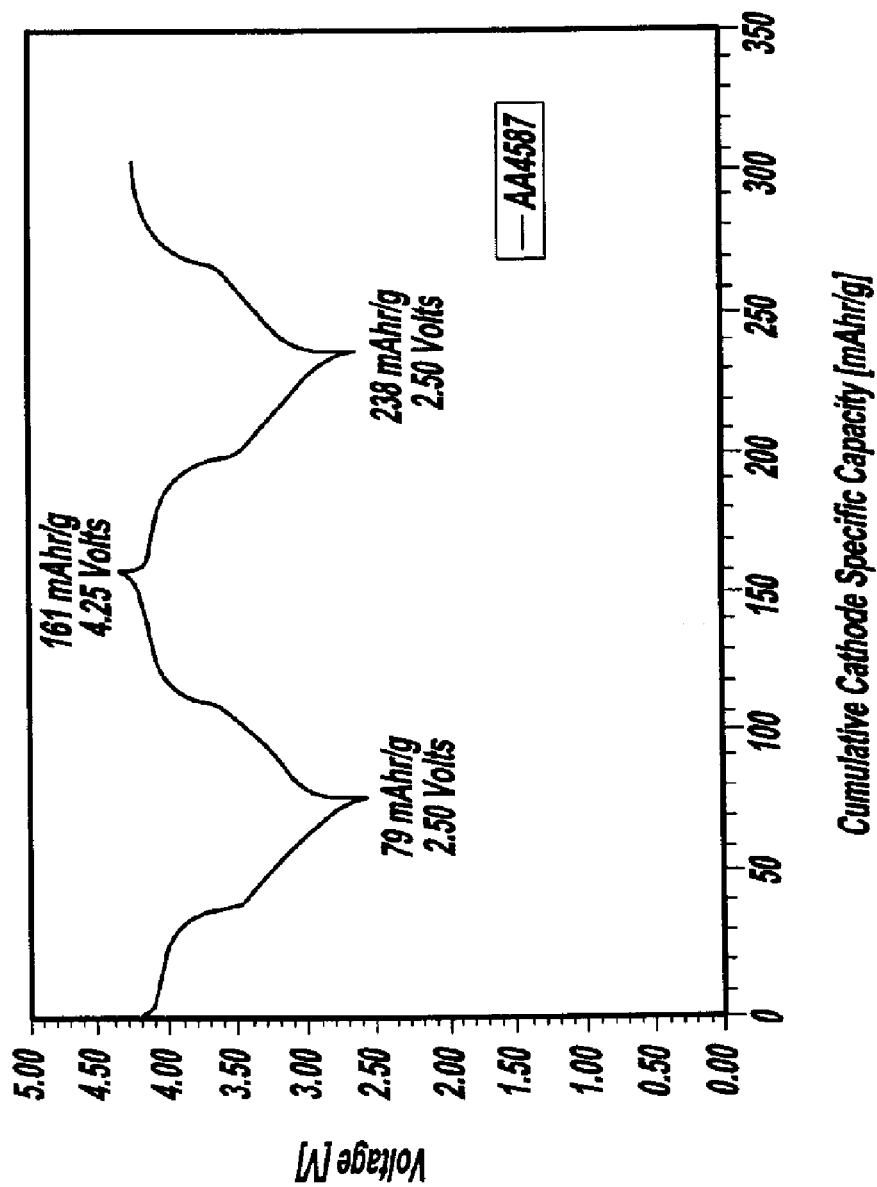
FIG. 11 shows variation in cell voltage versus cathode specific capacity for a sodium ion cell at a cathode to anode mass ratio of 2.67:1.

A representative test cell contained 41.1 mg of active NaVPO$_4$F and 15.4 mg of active hard carbon for a cathode to anode mass ratio of 2.67:1. The cell was charged and discharged using constant current conditions at 23° C. with an approximate C/10 (10 hour) rate between voltage limits of 2.50 V and 4.25 V. FIG. 11 shows the variation in cell voltage versus cathode specific capacity for the sodium ion cell under test. The discharge process corresponds to a specific capacity for the cathode of 79 mAh/g while the charge process corresponds to a cathode specific capacity of 82 mAh/g. This represents good reversible performance. The hard carbon cycles reversibly at an approximate specific capacity of 219 mAh/g. The cell continues to cycle well after these initial cycles.

Figure 12:
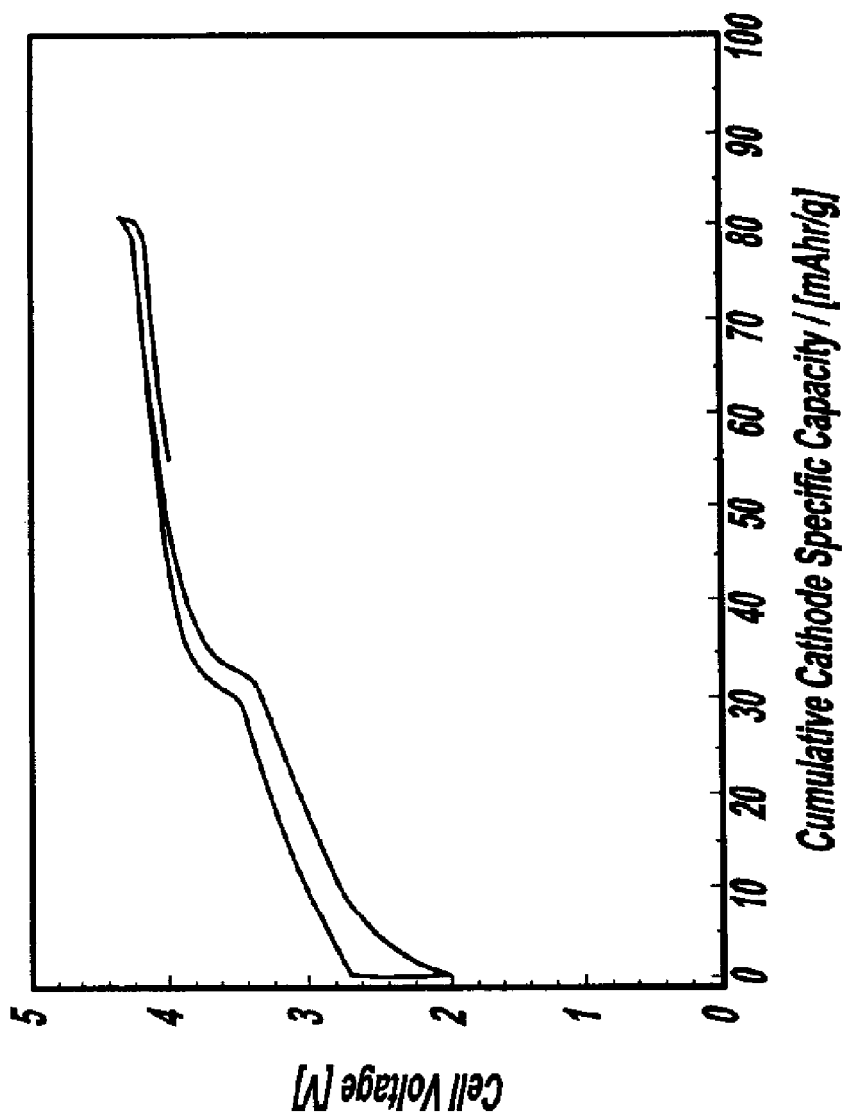
FIG. 12 shows variation in cell voltage versus cathode specific capacity for a sodium ion cell at a cathode to anode mass ratio of 2.46:1.

The NaVPO$_4$F/hard carbon sodium ion system was further evaluated using the EVS method. A representative test cell contained 44.7 mg of active NaVPO$_4$F and 18.2 mg of active hard carbon for a cathode to anode mass ratio of 2.46:1. The cell was charged and discharged using EVS conditions at 23° C. with an approximate C/10 (10 hour) rate between voltage limits of 2.00 V and 4.30 V. FIG. 12 shows the variation in cell voltage versus cathode specific capacity for the sodium ion cell under test. The discharge process corresponds to a specific capacity for the cathode of 82 mAh/g, while the charge process corresponds to a cathode specific capacity of 82 mAh/g. Thus for the EVS cycle shown in the figure, the process is demonstrated to be coulombically efficient. This is an extremely good and reversible performance. The hard carbon cycles reversibly at an approximate specific capacity of 202 mAh/g.

Figure 13:
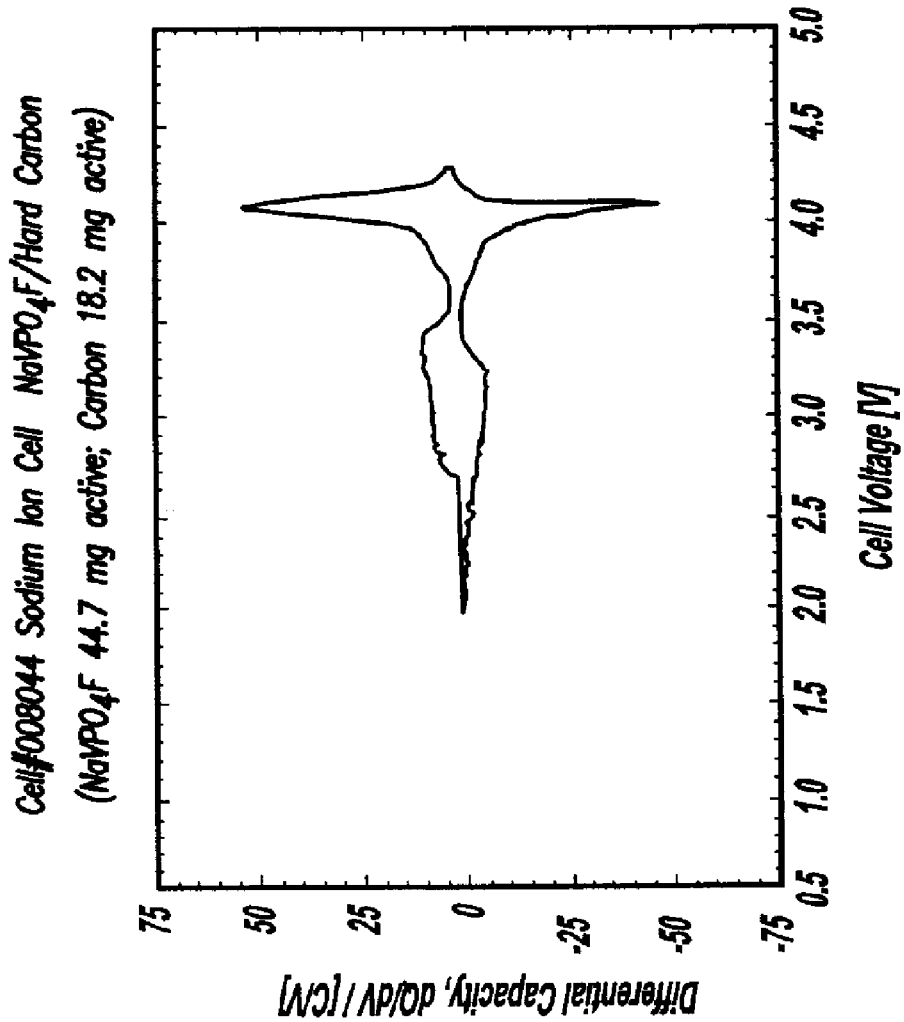
FIG. 13 shows EVS differential capacity data for a sodium ion cell.

FIG. 13 shows the corresponding EVS differential capacity data for the sodium ion cell and demonstrates the reversibility of the system. The cell charge process is shown above the 0-axis (i.e. positive differential capacity data), while the discharge process is below the axis (i.e. negative differential capacity data). The overall charge-discharge process appears reversible, and no features are present in the figure which suggest irreversible cell reactions are taking place.

The invention has been described above with respect to certain preferred embodiments. Based on the description, variations, modifications, and substitutions will be apparent to those of skill in the art that are also within the scope of the invention, which is defined by and limited only in the attached claims.

What is claimed is:

1. A battery comprising a positive electrode, a negative electrode and an electrolyte wherein:

the positive electrode comprises an electrochemically active material selected from the group consisting of sodium transition metal phosphates, and sodium mixed metal phosphates that can reversibly cycle sodium ions; and the negative electrode comprises a graphite characterized by having an interlayer spacing $d_{002}$ greater than that found in crystalline graphite, capable of inserting sodium ions and that cycles reversibly at a specific capacity greater than 100 mAh/g.

2. A battery according to claim 1, wherein the negative electrode cycles reversibly at a specific capacity greater than 200 mAh/g.

3. A battery according to claim 1, wherein the negative electrode cycles reversibly at a specific capacity greater than 300 mAh/g.

4. A battery according to claim 1, wherein the graphite is characterized by having an x-ray diffraction pattern having a 002 peak centered at about 24.2 degrees 2θ and a 004 peak centered at about 43.3 degrees 2θ.

5. A battery according to claim 1, wherein the electrochemically active material comprises a sodium transition metal phosphate.

6. A battery according to claim 5, wherein the transition metal comprises a transition metal selected from the group consisting of vanadium, manganese, iron, cobalt, copper, nickel, titanium, and mixtures thereof.

7. A battery according to claim 1, wherein the electrochemically active material comprises a sodium vanadium compound.

8. A battery according to claim 1, wherein the electrochemically active material has general formula $$Na_3M_2(PO_4)_3$$

wherein M comprises a transition metal group consisting of V, Mn, Fe, Co, Cu, Ni, Ti, and mixtures thereof.

9. A battery according to claim 8, wherein M comprises vanadium.

10. A battery according to claim 1, wherein the electrochemically active material comprises a compound of formula $$NaFe_xMg_{1-x}PO_4$$

wherein 0<x<1.

* * * * *

UNITED STATES PATENT AND TRADEMARK OFFICE
CERTIFICATE OF CORRECTION

PATENT NO. : 7,759,008 B2
APPLICATION NO. : 10/906182
DATED : July 20, 2010
INVENTOR(S) : Jeremy Barker, M. Yazid Saidi and Jeffrey Swoyer Page 1 of 1

It is certified that error appears in the above-identified patent and that said Letters Patent is hereby corrected as shown below:

Column 8 Line 20
Delete "$e \geq 0$"
Insert -- $e > 0$ --

Signed and Sealed this
Twenty-first Day of June, 2011

David J. Kappos
*Director of the United States Patent and Trademark Office*